United States Patent
Li et al.

(10) Patent No.: US 12,492,343 B2
(45) Date of Patent: *Dec. 9, 2025

(54) MESOGEN COMPOUNDS

(71) Applicant: Transitions Optical, Ltd., Tuam (IE)

(72) Inventors: Yannian Li, Murrysville, PA (US); Ramaiahgari Reddy, Murrysville, PA (US); Alan M. Grubb, Pittsburgh, PA (US); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 652 days.

This patent is subject to a terminal disclaimer.

(21) Appl. No.: 17/914,522

(22) PCT Filed: Mar. 27, 2020

(86) PCT No.: PCT/EP2020/058782
§ 371 (c)(1),
(2) Date: Sep. 26, 2022

(87) PCT Pub. No.: WO2021/190765
PCT Pub. Date: Sep. 30, 2021

(65) Prior Publication Data
US 2023/0295514 A1  Sep. 21, 2023

(51) Int. Cl.
*C09K 19/38* (2006.01)
*A61F 9/04* (2006.01)
*A61L 27/34* (2006.01)
*C09K 19/04* (2006.01)
*C09K 19/56* (2006.01)
*C09K 19/60* (2006.01)

(52) U.S. Cl.
CPC .......... *C09K 19/3895* (2013.01); *A61F 9/045* (2013.01); *A61L 27/34* (2013.01); *C09K 19/56* (2013.01); *C09K 19/60* (2013.01); *A61L 2430/16* (2013.01); *C09K 2019/0448* (2013.01)

(58) Field of Classification Search
CPC .................................................... C09K 19/34
See application file for complete search history.

(56) References Cited

U.S. PATENT DOCUMENTS

| | | |
|---|---|---|
| 5,417,884 A | 5/1995 | Etzbach et al. |
| 5,502,206 A | 3/1996 | Zahn et al. |
| 5,804,097 A * | 9/1998 | Delavier ............ C09K 19/2014 252/299.61 |
| 6,060,133 A | 5/2000 | Lacey et al. |
| 6,335,462 B1 | 1/2002 | Etzbach et al. |
| 6,521,763 B1 | 2/2003 | Fischer et al. |
| 6,636,291 B2 | 10/2003 | Van De Witte et al. |
| 6,653,499 B1 | 11/2003 | Hall et al. |
| 7,094,360 B2 | 8/2006 | Wellinghoff et al. |
| 7,098,359 B2 | 8/2006 | Wellinghoff et al. |
| 7,910,019 B2 | 3/2011 | He et al. |
| 7,910,020 B2 | 3/2011 | He et al. |
| 8,349,210 B2 | 1/2013 | Xu et al. |
| 8,409,674 B2 | 4/2013 | Harding et al. |
| 8,628,685 B2 | 1/2014 | He et al. |
| 8,828,284 B2 | 9/2014 | Carpenter |
| 8,926,091 B2 | 1/2015 | Kumar et al. |
| 9,334,439 B2 | 5/2016 | DeMeio et al. |
| 9,683,102 B2 | 6/2017 | Cefalo et al. |
| 11,505,744 B2 | 11/2022 | Matsuyama et al. |
| 2001/0036517 A1 | 11/2001 | Chen et al. |
| 2012/0002141 A1 | 1/2012 | Dai et al. |
| 2015/0234208 A1 | 8/2015 | De Ayguavives et al. |
| 2017/0275534 A1 | 9/2017 | Reddy et al. |

FOREIGN PATENT DOCUMENTS

| | | |
|---|---|---|
| CN | 1134168 A | 10/1996 |
| CN | 102076820 A | 5/2011 |
| CN | 102112579 A | 6/2011 |

(Continued)

OTHER PUBLICATIONS

Andersch et al., "Synthesis and liquid crystalline properties of novel laterally connected trimesogens and tetramesogens", Liquid Crystals, 1996, pp. 103-113, vol. 21:1.

Kumar et al., "Preliminary communication First example of a functionalized triphenylene discotic trimer: molecular engineering of advanced materials", Liquid Crystals, 1999, pp. 939-941, vol. 26:6.

Lee et al., "Liquid crystalline compounds having a tribranched structure: substituted malonic esters consisting of two Schiff's base units and a cholesteryloxyalkyl substituent", Liquid Crystals, 2001, pp. 1519-1525, vol. 28:10.

(Continued)

*Primary Examiner* — Chanceity N Robinson
(74) *Attorney, Agent, or Firm* — The Webb Law Firm

(57) ABSTRACT

Optionally polymerizable mesogen compounds are disclosed that include a polyvalent non-mesogenic core X to which is bonded three or four separate extensions, where each extension independently includes, in sequence, a linking group -L-, and a mesogen group—[Mesogen]. The mesogen compounds are represented by the following Formula (I),

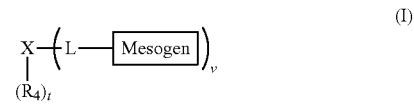

(I)

With reference to Formula (I), v is 3 or 4; t is 0 or 1; at least one Mesogen includes at least four cyclic groups; each -L- independently has an average chain length of at least 15 bonds; and at least one -L- has an average chain length of at least 25 bonds. Liquid crystal compositions are disclosed that include such mesogen compounds, and optical elements that include such mesogen compounds.

14 Claims, No Drawings

(56) References Cited

FOREIGN PATENT DOCUMENTS

| | | |
|---|---|---|
| CN | 102911052 A | 2/2013 |
| CN | 110168051 A | 8/2019 |
| DE | 19941569 A1 | 3/2001 |
| EP | 0583605 A1 | 2/1994 |
| EP | 0626386 A1 | 11/1994 |
| EP | 1412447 B1 | 9/2008 |
| JP | H9504788 A | 5/1997 |
| JP | H11510829 A | 9/1999 |
| JP | 2000111922 A | 4/2000 |
| JP | 2001505879 A | 5/2001 |
| JP | 2003529533 A | 10/2003 |
| JP | 2003535379 A | 11/2003 |
| JP | 200475623 A | 3/2004 |
| JP | 2006265403 A | 10/2006 |
| JP | 2011526321 A | 10/2011 |
| WO | 03006570 A2 | 1/2003 |
| WO | 2009158488 A1 | 12/2009 |

OTHER PUBLICATIONS

Yao et al., "Synthesis and mesomorphism of novel star-shaped glassy liquid crystals containing pentaerythritol esters", Tetrahedron Letters, 2004, pp. 8953-8956, vol. 45.

* cited by examiner

MESOGEN COMPOUNDS

CROSS-REFERENCE TO RELATED APPLICATION

This application is the United States national phase of International Application No. PCT/EP2020/058782 filed Mar. 27, 2020, the disclosure of which is hereby incorporated by reference in its entirety.

BACKGROUND OF THE INVENTION

Field of the Invention

The present invention relates to optionally polymerizable mesogen compounds that include a polyvalent non-mesogenic core to which is bonded three or four separate extensions, where each extension independently includes, in sequence, a linking group and a mesogen group, liquid crystal compositions that include such mesogen compounds, and to optical elements that include such mesogen compounds.

Description of Related Art

The molecules of a liquid crystal are typically capable of aligning with one another in substantially one direction, which results in a fluid material having anisotropic properties, such as with regard to optical, electromagnetic, and/or mechanical properties. A mesogen is typically described as the primary or fundamental unit (or segment or group) of a liquid crystal material that induces, and/or is induced into, structural order amongst and between liquid crystals (such as other liquid crystal materials that are present).

Liquid crystal polymers are polymers capable of forming regions of highly ordered structure while in a liquid phase. Liquid crystal polymers have a wide range of uses, including engineering plastics, and gels for liquid crystal displays (LCD's). The structure of liquid crystal polymers can be described as being composed of densely packed elongated polymer chains that provide self-reinforcement almost to the melting point of the polymer.

Dichroism can occur in liquid crystals, including mesogen compounds, due to the optical anisotropy of the molecular structure, or the presence of impurities, or the presence of dichroic dyes and/or photochromic-dichroic materials. As used herein, the term "dichroism" and similar terms, such as "dichroic", means the ability to absorb one of two orthogonal plane polarized components of radiation (including transmitted and/or reflected radiation) more strongly than the other orthogonal plane polarized component. Photochromic-dichroic materials possess both photochromic properties and dichroic properties. A photochromic-dichroic material, in some instances, can be described as including a photochromic molecule (or core, or moiety) to which is covalently attached at least one lengthening group at least a portion of which is capable of being aligned with (or by) a mesogenic material.

When used in combination with liquid crystal materials, such as mesogen compounds, the dichroic properties of photochromic-dichroic compounds, such as polarization efficiency and absorption ratio, can be enhanced. While not intending to be bound by any theory, it is believed, based on the evidence at hand, that alignment of the photochromic-dichroic compounds with aligned mesogen compounds enhances the dichroic properties of the photochromic-dichroic compounds, such as improved absorption ratio (AR) values.

The photochromic properties of photochromic-dichroic compounds can be enhanced by a chemical environment that allows the photochromic portion thereof to efficiently undergo a reversible conformational change between an absorbing (or colored state) and a non-absorbing (or non-colored state). Examples of quantifiable photochromic properties include, but are not limited to, fade rate (sometimes referred to as fade half-life, $T_{1/2}$); change in optical density (sometimes designated as $\Delta OD$); the change in optical density ($\Delta OD$) at saturation; sensitivity (sometimes designated as $\Delta OD/Min$); and the efficiency at which the photochromic compound absorbs radiation required to activate the photochromic compound (sometimes designated as chromaticity). The chemical environment provided by the aligned mesogen compounds, while enhancing dichroic properties of the dichroic portion of a photochromic-dichroic compound, can in some instances provide a chemical environment that adversely restricts or limits the efficient reversible conformational change of the photochromic portion of the photochromic-dichroic compound.

It would be desirable to develop new mesogen compounds that are capable of further enhancing the dichroic properties of dichroic materials, such as photochromic-dichroic compounds. It would be further desirable that such newly developed mesogen compounds maintain or enhance the photochromic properties of photochromic-dichroic materials used in conjunction therewith.

SUMMARY OF THE INVENTION

In accordance with the present invention, there is provided a mesogen-containing compound represented by the following Formula (I),

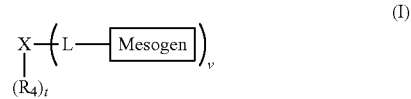

wherein,
  v is 3 or 4,
  t is 0 or 1,
  (A) each Mesogen, independently for each v, is represented by the following Formula (II),

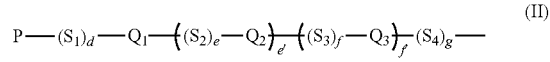

wherein for Formula (II),
    P is selected from hydrogen, halogen, alkyl, haloalkyl, alkoxy, haloalkoxy, acrylate, methacrylate, trihalomethacrylate, cyanoacrylate, acrylamido, methacrylamido, oxirane, hydroxyl, primary amino, carboxylic acid, carboxylic acid ester, siloxane, carbosilane, cyano, or nitro;
    $S_1$, $S_2$, $S_3$, and $S_4$, for each occurrence, are independently selected from a spacer unit chosen from —$CH_2$—; —O—; —C(O)—; —N=N—; —CH=CH—; —C≡C—; —CH=N—; —$CF_2$—; or —NH—, provided that when two spacer units comprising heteroatoms are linked together the spacer units are linked so that heteroatoms are not directly linked to each other;

d is 0 to 20;

e, f, and g, for each occurrence, are independently 0 to 3;

$Q_1$, $Q_2$, and $Q_3$, for each occurrence, are independently a divalent group selected from the group consisting of unsubstituted or substituted cycloaliphatic group; unsubstituted or substituted heterocycloaliphatic group; unsubstituted or substituted aryl; and unsubstituted or substituted heteroaryl; wherein each cycloaliphatic group substituent, each heterocycloaliphatic group substituent, each aryl substituent, and each heteroaryl substituent is in each case independently selected from $—(S_1)_d—P$, where $S_1$, d, and P are each as defined with regard to Formula (II); and e' and f', for each occurrence, are independently from 0 to 6, provided the sum of e' and f' is at least 2;

(B) each -L-, independently for each v, is represented by the following Formula (III),

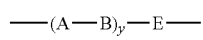
(III)

wherein, (i) y is 0 to 30;

(ii) each A independently for each y is a divalent group selected from the group consisting of single bond, aliphatic group, and haloaliphatic group;

(iii) each B independently for each y is a divalent group selected from the group consisting of —O—; —C(O)O—; —OC(O)O—; —C(O)N($R_1$)— where $R_1$ is H or alkyl; —NH—C(O)O—; —N($R_2$)C(O)N ($R_2$)— where each $R_2$ is independently selected from H or alkyl;

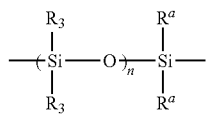

where n is 1 to 4, each $R^a$ is independently selected from methyl, ethyl, or phenyl, and each $R_3$ independently for each n is independently selected from methyl, ethyl, or phenyl;

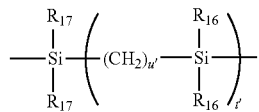

where t' is from 1 to 4, u' is from 1 to 5 independently for each t', each $R_{16}$ independently for each t' is independently selected from methyl, ethyl, or phenyl, and each $R_{17}$ is independently selected from methyl, ethyl, or phenyl; and —Si($R_5$)($R_5$)— where each $R_5$ is independently selected from methyl, ethyl, or phenyl; and (iv) E is a divalent group selected from the group consisting of aliphatic group and haloaliphatic group;

(C) X is a polyvalent group selected from the group consisting of Si; N; Ge; P (i.e., phosphorous); siloxane having from 2 to 6 Si atoms; carbosilane having from 2 to 5 Si atoms, and from 1 to 5 methylene groups between each pair of Si atoms; unsubstituted or substituted aliphatic group having from 1 to 10 carbon atoms; unsubstituted or substituted cycloaliphatic group; unsubstituted or substituted heterocycloaliphatic group; unsubstituted or substituted aryl group; and unsubstituted or substituted heteroaryl group; wherein each aliphatic group substituent, each cycloaliphatic group substituent, each heterocycloaliphatic group substituent, each aryl substituent, and each heteroaryl substituent is in each case independently selected from $—(S_1)_d—P$, where $S_1$, d, and P are each as defined with regard to Formula (II); and (D) $R_4$ is selected from the group consisting of $—(S_1)_d—P$, where $S_1$, d, and P are each as defined with regard to Formula (II); =O; and unsubstituted or substituted phenyl group, wherein each phenyl substituent is independently selected from $—(S_1)_d—P$, where $S_1$, d, and P are each as defined with regard to Formula (II), provided that at least one Mesogen includes at least four cyclic groups, and provided that each -L- independently comprises an average chain length of at least 15 bonds, and further provided that at least one -L- comprises an average chain length of at least 25 bonds.

In further accordance with the present invention, there is provided liquid crystal compositions that include the mesogen-containing compound of the present invention, such as described with reference to Formula (I).

There is provided, in further accordance with the present invention, an optical element that comprises a substrate; and a layer on at least a portion of a surface of the substrate, in which the layer comprises the mesogen-containing compound of the present invention, such as described with reference to Formula (I).

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DESCRIPTION OF THE INVENTION

The mesogen compounds of the present invention, such as represented by Formula (I), are referred to herein as "mesogen compounds", "mesogenic compounds", "mesogen-containing compounds", "star-shaped mesogen compounds", and "star-shaped mesogen-containing compounds".

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

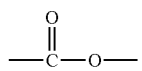

or equivalently —C(O)O—, is inclusive of the right-to-left representation thereof,

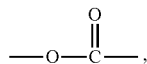

or equivalently —O(O)C— or —OC(O)—.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

The discussion of the invention herein may describe certain features as being "particularly" or "preferably" within certain limitations (e.g., "preferably", "more preferably", or "even more preferably", within certain limitations). It is to be understood that the invention is not limited to or by these particular or preferred limitations, but encompasses the entire scope of the disclosure.

As used herein, the term "photochromic" and similar terms, such as "photochromic compound" means having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state (such as a "clear state") to a second state (such as a "colored state") in response to actinic radiation, and reverting back to the first state in response to thermal energy. The term "non-thermally reversible photochromic compounds/materials" as used herein means compounds/materials capable of converting from a first state (such as a "clear state") to a second state (such as a "colored state") in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds used in conjunction with the present invention can have a different absorption spectrum in each of the first and second state. For example, while not limiting herein, a photochromic compound used in conjunction with the present invention can be clear in the first state and colored in the second state. Alternatively, a photochromic compound used in conjunction with the present invention can have a first color in the first state and a second color in the second state. Additionally, a photochromic-dichroic compound used in conjunction with the present invention can have a first alignment in a first state, and a second alignment in a second state, in which one of the first alignment and second alignment is substantially non-aligned.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, can be used to described various embodiments of the invention. It is to be understood, however, that the invention can assume various alternative orientations and, accordingly, such terms are not to be considered as limiting.

As used herein, the terms "formed over", "deposited over", "provided over", "applied over", "residing over", or "positioned over", mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, the term "(meth)acrylate" and similar terms, such as "(meth)acrylic acid ester" means methacrylates and/or acrylates. As used herein, and in accordance with some embodiments, the term "(meth)acrylate" such as with regard to groups, and substituents of various groups, of the mesogen compounds of the present invention, and related terms, such as "(meth)acrylate group" and "(meth)acrylate substituent", includes a material represented by —O—C(O)—C(R')=CH$_2$, where R' is hydrogen or methyl. As used herein, the term "(meth)acrylic acid" means methacrylic acid and/or acrylic acid. As used herein, the term "(meth)acrylamido" means acrylamido (—N(H)—C(O)—C(H)=CH$_2$) and methacrylamido (—N(H)—C(O)—C(CH$_3$)=CH$_2$).

As used herein, and in accordance with some embodiments, the term "carboxylic acid" such as with regard to groups, and substituents of various groups, of the mesogen-containing compounds of the present invention, and related terms, such as "carboxylic acid group" and "carboxylic acid substituent" includes a material represented by —C(O)OH.

As used herein, and in accordance with some embodiments, the term "carboxylic acid ester" such as with regard to groups, and substituents of various groups, of the mesogen-containing compounds of the present invention, and related terms, such as "carboxylic acid ester group" and "carboxylic acid ester substituent" means a material represented by —C(O)OR, where R is, for example, selected from aliphatic groups, cycloaliphatic groups, heterocycloaliphatic groups, aryl groups, and heteroaryl groups.

As used herein, the term "aliphatic" and related terms, such as "aliphatic group(s)" means non-cyclic and non-aromatic hydrocarbon groups, which include at least one carbon atom, such as 1 to 20 carbon atoms, such as $C_1$-$C_{20}$ aliphatic groups, or $C_1$-$C_{10}$ aliphatic groups, or $C_1$-$C_6$ aliphatic groups; can be linear or branched; optionally include one or more interior and/or terminal alkene (or alkenyl) groups; and optionally include one or more interior and/or terminal alkyne (or alkynyl) groups. When including two or more alkene groups, the alkene groups of an aliphatic group can be conjugated and/or non-conjugated. When including two or more alkyne groups, the alkyne groups of an aliphatic group can be conjugated and/or non-conjugated. When including at least one alkene group and at least one alkyne group, the alkene and alkyne groups of the aliphatic group can be conjugated and/or non-conjugated relative to each other.

Examples of aliphatic groups include, but are not limited to, alkyl groups. As used herein, the term "alkyl" and related terms, such as "alkyl group(s)" means groups which include at least one carbon atom, such as 1 to 20 carbon atoms, such as $C_1$-$C_{20}$ alkyl groups, or $C_1$-$C_{10}$ alkyl groups, or $C_1$-$C_6$ alkyl groups; are linear or branched; and are saturated (and correspondingly are free of alkene groups and alkyne groups). Examples of alkyl groups include, but are not limited to, methyl, ethyl, n-propyl, iso-propyl, n-butyl, iso-butyl, sec-butyl, t-butyl, linear or branched pentyl, linear or branched hexyl, linear or branched heptyl, linear or branched octyl, linear or branched nonyl, linear or branched decyl, linear or branched undecyl, linear or branched dodecyl, linear or branched tridecyl, linear or branched tetradecyl, linear or branched pentadecyl, linear or branched hexadecyl, linear or branched heptadecyl, linear or branched octadecyl, linear or branched nonadecyl, and linear or branched eicosanyl.

As used herein, recitations of "linear or branched" groups, such as, but not limited to, linear or branched alkyl, are herein understood to include, for purposes of non-limiting illustration, a methylene group or a methyl group; groups that are linear, such as linear $C_2$-$C_{20}$ alkyl groups; and groups that are appropriately branched, such as, but not limited to, branched $C_3$-$C_{20}$ alkyl groups.

Examples of aliphatic groups include, but are not limited to, alkenyl groups. As used herein, the term "alkenyl" and related terms, such as "alkenyl groups" means groups which include at least two carbon atoms, such as 2 to 20 carbon atoms, such as $C_2$-$C_{20}$ alkenyl groups, or $C_2$-$C_{10}$ alkenyl groups, or $C_2$-$C_6$ alkenyl groups; are linear or branched; and include one or more interior and/or terminal alkene (or alkenyl) groups. Examples of alkenyl groups include, but are not limited to, those examples of linear or branched alkyl groups recited previously herein, which have at least two carbon atoms and at least one alkene (or alkenyl) group, such as, but not limited to, ethenyl, linear or branched propenyl, linear or branched butenyl, linear or branched pentenyl, linear or branched hexenyl, etc.

Examples of aliphatic groups include, but are not limited to, alkynyl groups. As used herein, the term "alkynyl" and related terms, such as "alkynyl group(s)" means groups which include at least two carbon atoms, such as 2 to 20 carbon atoms, such as $C_2$-$C_{20}$ alkynyl groups, or $C_2$-$C_{10}$ alkynyl groups, or $C_2$-$C_6$ alkynyl groups; are linear or branched; and include one or more interior and/or terminal alkyne (or alkynyl) groups. Examples of alkynyl groups include, but are not limited to, those examples of linear or branched alkyl groups recited previously herein, which have at least two carbon atoms and at least one alkyne (or alkynyl) group, such as, but not limited to, ethynyl, propynyl, butynyl, linear or branched pentynyl, linear or branched hexynyl, etc.

As used herein, the term "haloaliphatic" and related terms, such as "haloaliphatic group(s)" means non-cyclic and non-aromatic hydrocarbon groups, which include at least one carbon atom, such as 1 to 20 carbon atoms, such as $C_1$-$C_{20}$ haloaliphatic groups, or $C_1$-$C_{10}$ haloaliphatic groups, or $C_1$-$C_6$ haloaliphatic groups; include at least one halo group selected from fluoro (F), chloro (Cl), bromo (Br), and/or iodo (I); are linear or branched; optionally include one or more interior and/or terminal alkene groups; and optionally include one or more interior and/or terminal alkyne groups. When including two or more alkene groups, the alkene groups of an haloaliphatic group can be conjugated and/or non-conjugated. When including two or more alkyne groups, the alkyne groups of an haloaliphatic group can be conjugated and/or non-conjugated. When including at least one alkene group and at least one alkyne group, the alkene and alkyne groups of the haloaliphatic group can be conjugated and/or non-conjugated relative to each other. At least one available hydrogen of, and up to all available hydrogens of, a haloaliphatic group can be replaced with a halo group, such as selected from fluoro (F), chloro (Cl), bromo (Br), and/or iodo (I). Correspondingly, as used herein, the term "haloaliphatic" includes, but is not limited to, "perhaloaliphatic" and related terms, such as "perhaloaliphatic group(s)".

Examples of haloaliphatic groups include, but are not limited to, haloalkyl groups. As used herein, the term "haloalkyl" and related terms, such as "haloalkyl group(s)" means groups which include at least one carbon atom, such as 1 to 20 carbon atoms, such as $C_1$-$C_{20}$ haloalkyl, or $C_1$-$C_{10}$ haloalkyl, or $C_1$-$C_6$ haloalkyl; are linear or branched; include at least one halo group, such as selected from fluoro (F), chloro (Cl), bromo (Br), and/or iodo (I); and are saturated (and correspondingly are free of alkene groups and alkyne groups). At least one available hydrogen of, and up to all available hydrogens of, a haloalkyl group can be replaced with a halo group, such as selected from fluoro (F), chloro (Cl), bromo (Br), and/or iodo (I). Correspondingly, as used herein, the term "haloalkyl" includes, but is not limited to, "perhaloalkyl" and related terms, such as "perhaloalkyl group(s)." Examples of haloalkyl groups include, but are not limited to, those examples of linear or branched alkyl groups recited above, which include at least one halo group, such as, but not limited to, halomethyl, haloethyl, linear or branched halopropyl, linear or branched halobutyl, linear or branched halopentyl, linear or branched halohexyl, etc., each independently including at least one halo group.

Examples of haloaliphatic groups include, but are not limited to, haloalkenyl groups. As used herein, the term "haloalkenyl" and related terms, such as "haloalkenyl group(s)" means groups which include at least two carbon atoms, such as 2 to 20 carbon atoms, such as $C_2$-$C_{20}$ haloalkenyl, or $C_2$-$C_{10}$ haloalkenyl, or $C_2$-$C_6$ haloalkenyl; are linear or branched; include at least one halo group, such as selected from fluoro (F), chloro (Cl), bromo (Br), and/or iodo (I); and include one or more interior and/or terminal alkene (or alkenyl) groups. Examples of haloalkenyl groups include, but are not limited to, those examples of linear or branched alkyl groups recited above, which have at least two carbon atoms, at least one alkene (or alkenyl) group, and at least one halo group, such as, but not limited to, haloethenyl, linear or branched halopropenyl, linear or branched halobutenyl, linear or branched halopentenyl, linear or branched halohexenyl, etc., each independently including at least one halo group.

Examples of haloaliphatic groups include, but are not limited to, haloalkynyl groups. As used herein, the term "haloalkynyl" and related terms, such as "haloalkynyl group(s)" means groups which include at least two carbon atoms, such as 2 to 20 carbon atoms, such as $C_2$-$C_{20}$ haloalkynyl, or $C_2$-$C_{10}$ haloalkynyl, or $C_2$-$C_6$ haloalkynyl; are linear or branched; include at least one halo group (or halogen group), such as selected from fluoro (F), chloro (Cl), bromo (Br), and/or iodo (I); and include one or more interior and/or terminal alkyne (or alkynyl) groups. Examples of haloalkynyl groups include, but are not limited to, those examples of linear or branched alkyl groups recited above, which have at least two carbon atoms, at least one alkyne (or alkynyl) group, and at least one halo group, such as, but not limited to, haloethynyl, halopropynyl, halobutynyl, linear or branched halopentynyl, linear or branched halohexynyl, etc., each independently including at least one halo group.

As used herein, the term "cycloaliphatic" and related terms, such as "cycloaliphatic group(s)" means cyclic and non-aromatic hydrocarbon groups, which include at least three carbon atoms, such as 3 to 20 carbon atoms, such as $C_3$-$C_{20}$ cycloaliphatic groups, or $C_3$-$C_{10}$ cycloaliphatic groups, or $C_3$-$C_8$ cycloaliphatic groups; optionally include at least one unsaturated group selected from alkene and/or alkyne; and optionally include two or more fused cycloaliphatic rings.

Examples of cycloaliphatic groups include, but are not limited to, cycloalkyl groups. As used herein, the term "cycloalkyl" and related terms, such as "cycloalkyl group(s)" means groups which include at least three carbon atoms, such as 3 to 20 carbon atoms, such as $C_3$-$C_{20}$ cycloalkyl groups, or $C_3$-$C_{10}$ cycloalkyl groups, or $C_3$-$C_8$ cycloalkyl groups; optionally include at least one unsaturated group selected from alkene and/or alkyne; and optionally include two or more fused cycloalkyl rings. Examples of cycloalkyl groups include, but are not limited to, cyclopropyl; cyclobutyl; cyclopentyl; cyclohexyl; cycloheptyl; cyclooctyl; cyclononyl; cyclodecyl; cycloundecyl; cyclododecyl; norbornyl; decahydronaphthalenyl; tetradecahydroanthracenyl; tetradecahydrophenanthrenyl; and dodecahydro-1H-phenalenyl.

As used herein, the term "heterocycloaliphatic" and related terms, such as "heterocycloaliphatic group(s)" means cyclic and non-aromatic groups, which include at least two carbon atoms, such as 2 to 20 carbon atoms, such as $C_2$-$C_{20}$ heterocycloaliphatic groups, or $C_2$-$C_{10}$ heterocycloaliphatic groups, or $C_2$-$C_8$ heterocycloaliphatic groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloaliphatic ring.

Examples of heterocycloaliphatic groups include, but are not limited to, heterocycloalkyl groups. As used herein, the term "heterocycloalkyl" and related terms, such as "heterocycloalkyl group(s)" means groups which include at least two carbon atoms, such as 2 to 20 carbon atoms, such as $C_2$-$C_{20}$ heterocycloalkyl groups, or $C_2$-$C_{10}$ heterocycloalkyl groups, or $C_2$-$C_8$ heterocycloalkyl groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloalkyl ring. Examples of heterocycloalkyl groups include, but are not limited to, imidazolyl, tetrahydrofuranyl, tetrahydropyranyl, piperidinyl, piperazinyl, morpholinyl, 7-oxabicyclo[2.2.1]heptanyl, octahydrocyclopenta[b]pyranyl, and octahydro-1H-isochromenyl.

As used herein, the term "aryl" and related terms, such as "aryl group(s)" means cyclic aromatic groups, which include at least 6 carbon atoms, such as $C_6$-$C_{20}$ aryl groups, or $C_6$-$C_{14}$ aryl groups; and optionally include at least two fused rings, at least one of which is a fused aromatic ring. Examples of aryl groups include, but are not limited to, phenyl, naphthalenyl, anthracenyl, phenanthrenyl, triphenylenyl, 9,10-dihydroanthracenyl, 9,10-dihydrophenanthrenyl, and triptycenyl.

As used herein, the term "heteroaryl" and related terms, such as "heteroaryl group(s)" means cyclic aromatic groups, which include at least 3 carbon atoms, such as $C_3$-$C_{20}$ heteroaryl groups, or $C_5$-$C_{14}$ heteroaryl groups; at least one heteroatom in the aromatic ring, such as —O—, —N—, and/or —S—; and optionally include at least two fused rings, at least one of which is a fused heteroaromatic ring. Examples of heteroaryl groups include, but are not limited to, pyrazolyl, imidazolyl, triazinyl, furanyl, thiophenyl, pyranyl, pyridinyl, isoquinolinyl, and pyrimidinyl.

As used herein, the term "alkoxy" and related terms, such as "alkoxy group(s)" means a group represented by —OR, where R is a linear or branched alkyl group which includes at least one carbon atom, such as 1 to 20 carbon atoms, such as $C_1$-$C_{20}$ alkyl, or $C_1$-$C_{10}$ alkyl, or $C_1$-$C_6$ alkyl, and correspondingly the alkoxy group is, for example, $C_1$-$C_{20}$ alkoxy, or $C_1$-$C_{10}$ alkoxy, or $C_1$-$C_6$ alkoxy. Examples of alkoxy groups include, but are not limited to, those examples of alkyl groups recited previously herein, which include a terminal divalent oxygen linkage or group (or terminal ether linkage or group), such as, but not limited to, methoxy ($CH_3$—O—), ethoxy ($CH_3CH_2$—O—), n-propoxy ($CH_3CH_2CH_2$—O—), iso-propoxy, linear or branched butoxy, linear or branched pentoxy, linear or branched hexoxy, etc.

As used herein, the term "amino" and related terms, such as "amino group", includes groups represented by —N($R^{11}$)($R^{12}$), where $R^{11}$ and $R^{12}$ are each independently selected, for example, from hydrogen, aliphatic groups, cycloaliphatic groups, heterocycloaliphatic groups, aryl groups, and heteroaryl groups. As used herein, the term "primary amino" and related terms, such as "primary amino group" means a group represented by —$NH_2$.

As used herein, the term "halogen" and related terms, such as "halogen group(s)" and/or "halo group(s)" means a single bonded halogen atom, such as selected from fluoro (F), chloro (Cl), bromo (Br), and/or iodo (I).

As used herein, and unless otherwise explicitly stated, the term "hydrogen" and related terms, such as "hydrogen group(s)" means a single bonded hydrogen (—H).

With reference to Formula (II), and in accordance with some embodiments, P is selected from acrylate ($CH_2$=CHC(O)O—), methacrylate ($CH_2$=C($CH_3$)C(O)O—); trihalomethacrylate ($CH_2$=C($CX'_3$)C(O)O— where each X' independently is a halogen or halo group); cyanoacrylate ($CH_2$=C(CN)C(O)O—); oxirane

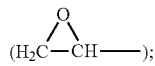

hydroxyl (—OH); primary amino (—$NH_2$); carboxylic acid (—C(O)OH); carboxylic acid ester (—C(O)OR, as described previously herein); siloxane; carbosilane; cyano (—CN); and nitro (—$NO_2$). Examples of trihalomethacrylate from which P can be selected include, but are not limited to, trifluoromethacrylate and trichloromethacrylate.

In accordance with some embodiments, P of Formula (II) is selected from a siloxane group. With some further embodiments, P of Formula (II) is selected from a siloxane having from 2 to 6 Si atoms. In accordance with some additional embodiments, P of Formula (II) is selected from a siloxane group represented by the following Formula (A),

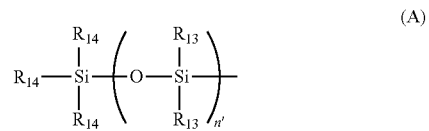

With reference to Formula (A): n' is from 1 to 5; independently for each n', each $R_{13}$ is independently selected from methyl, ethyl, or phenyl; and each $R_{14}$ is independently selected from methyl, ethyl, or phenyl.

In accordance with some embodiments, P of Formula (II) is selected from a carbosilane group. In accordance with some further embodiments, P of Formula (II) is selected from a carbosilane group having from 2 to 5 Si atoms, and from 1 to 5 methylene groups between each pair of Si atoms.

In accordance with some additional embodiments, P of Formula (II) is selected from a carbosilane group represented by the following Formula (B),

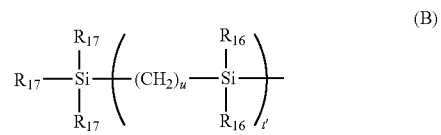

With reference to Formula (B): t' is from 1 to 4; independently for each t', u is from 1 to 5; independently for each t', each $R_{16}$ is independently selected from methyl, ethyl, or phenyl; and each $R_{17}$ is independently selected from methyl, ethyl, or phenyl.

In accordance with some embodiments, with reference to Formula (II), and independently for each v: subscript d, for each occurrence, is independently 0 to 20, or 0 to 15, or 0 to 12, or 0 to 10, or 0 to 8, or 0 to 5.

In accordance with some further embodiments, with reference to Formula (II), and independently for each v: subscripts e, f, and g, for each occurrence, are independently 0 to 3 (such as 0, 1, 2, or 3).

With some embodiments, e' and f' for each occurrence for Formula (II), are independently from 0 to 6 (such as 0, 1, 2, 3, 4, 5, or 6, and combinations thereof), provided the sum of e' and f' is at least 2, such as from 2 to 10 (such as 2, 3, 4, 5, 6, 7, 8, 9, or 10), or 2 to 5 (such as, 2, 3, 4, or 5), or 2 to 4 (such as 2, 3, or 4).

With further reference to Formula (II), $S_1$, $S_2$, $S_3$, and $S_4$, for each occurrence, are independently selected from a spacer unit chosen from —$CH_2$—; —O—; —C(O)—; —N=N—; —CH=CH—; —C≡C—; —CH=N—; —$CF_2$—; or —NH—, provided that when two spacer units comprising heteroatoms are linked together the spacer units are linked so that heteroatoms are not directly linked to each other. Adjacent spacer units can together form various divalent linkages, such as, but not limited to, alkyl linkages; ether linkages; carboxylic acid ester linkages, —O—C(O)— and/or —C(O)—O—; carbonate linkages, —O—C(O)—O—; amide linkages, —NH—C(O)— and/or —C(O)—NH—; urea linkages, —NH—C(O)—NH—; carbamate linkages, —O—C(O)—NH— and/or —NH—C(O)—O—; dione linkages, —C(O)—C(O)—; and combinations thereof, provided that the spacer units are linked so that heteroatoms are not directly linked to each other. For purposes of non-limiting illustration, and with some embodiments, spacer units being linked so that heteroatoms are not directly linked to each other, means, but is not limited to, —O— not being bonded directly to —O—; —NH— not being bonded directly to —NH—; —O— and —NH— not being bonded directly to each other; —N=N— not being bonded directly to —N=N—; —N=N— not being bonded directly to —O—; —N=N— not being bonded directly to —NH—; the nitrogen of —CH=N— not being bonded directly to the N of —CH=N—; and the N of —CH=N— not being bonded directly to —O—, —NH—, or —N=N—.

In accordance with some embodiments, and with reference to Formula (II), $S_1$, $S_2$, $S_3$, and $S_4$, for each occurrence, are independently selected from a spacer unit chosen from —(CH$_2$)—, —O—, —C(O)—, or —NH—; subscripts e, f, and g for each occurrence, are independently 0 to 3 (such as 0, 1, 2, or 3); provided that when two spacer units including heteroatoms are linked together the spacer units are linked so that heteroatoms are not directly linked to each other.

With reference to Formula (II) and in accordance with some embodiments of the present invention, $Q_1$, $Q_2$, and $Q_3$, for each occurrence, are independently a divalent group selected from unsubstituted or substituted cycloalkyl; unsubstituted or substituted phenyl; unsubstituted or substituted naphthyl; or unsubstituted or substituted triptycenyl; in which each cycloalkyl substituent, each phenyl substituent, each naphthyl substituent, and each triptycenyl substituent, is in each case independently selected from —(S$_1$)$_d$—P, where $S_1$, d, and P are each as defined with regard to Formula (II).

With some further embodiments, and with reference to Formula (II), $Q_1$, $Q_2$ and $Q_3$ for each occurrence, are independently a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; unsubstituted or substituted 1,8-naphthyl; and unsubstituted or substituted 1,4-triptycenyl; in which each 1,4-cycloalkyl substituent, each 1,4-phenyl substituent, each 1,5-naphthyl substituent, each 2,6-naphthyl substituent, each 1,8-naphthyl substituent, and each 1,4-triptycenyl substituent, is in each case independently selected from —(S$_1$)$_d$—P, where $S_1$, d, and P are each as defined with regard to Formula (II).

With some embodiments of the present invention, for Formula (II), P is selected from hydrogen, alkyl, alkoxy, acrylate, or methacrylate; and Formula (III) is further described as follows. For Formula (III), (i) y is 1 to 30; (ii) each A independently for each y is a divalent group selected from the group consisting of alkyl and haloalkyl; (iii) each B independently for each y is a divalent group selected from the group consisting of —O—; —C(O)O—; —OC(O)O—; —C(O)N(R$_1$)— where R$_1$ is H or alkyl; —NH—C(O)O—; —N(R$_2$)C(O)N(R$_2$)— where each R$_2$ is independently selected from H or alkyl;

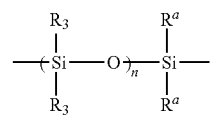

where n is 1 to 4, each R$^a$ is independently methyl, ethyl, or phenyl, and each R$_3$ independently for each n is selected from methyl, ethyl, or phenyl; and —Si(R$_5$)(R$_5$)— where each R$_5$ is independently selected from methyl, ethyl, or phenyl; and (iv) is a divalent group selected from the group consisting of alkyl groups and haloalkyl groups.

The polyvalent linking group X of Formula (I) is, with some embodiments, selected from Si; siloxane having from 2 to 6 Si atoms; carbosilane having from 2 to 5 Si atoms, and from 1 to 5 methylene groups between each pair of Si atoms; or unsubstituted or substituted aliphatic group having from 1 to 10 carbon atoms, where each aliphatic group substituent is independently selected from —(S$_1$)$_d$—P, where $S_1$, d, and P are each as defined with regard to Formula (II).

With some embodiments, the polyvalent linking group X of Formula (I) is selected from a polyvalent siloxane having from 2 to 6 Si atoms, or from 2 to 5 Si atoms. With some further embodiments, the polyvalent siloxane, from which X of Formula (I) can be selected, is selected from linear, branched, or cyclic siloxanes having from 2 to 6 Si atoms, or 2 to 5 Si atoms. With some additional embodiments, the cyclic siloxanes from which X can be selected include cyclotrisiloxanes and cyclotetrasiloxanes.

Cyclotrisiloxanes from which X of Formula (I) can be selected include, but are not limited to, those represented by the following Formula (C):

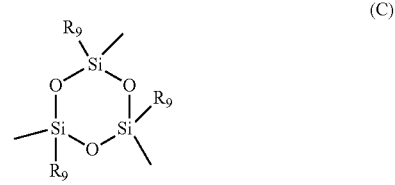

With reference to Formula (C), each R$_9$ is independently methyl, ethyl, or phenyl; t of Formula (I) is 0; and v of Formula (I) is 3.

Cyclotetrasiloxanes from which X of Formula (I) can be selected include, but are not limited to, those represented by the following Formula (D):

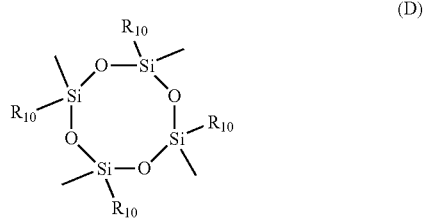

With reference to Formula (D), each R$_{10}$ is independently methyl, ethyl, or phenyl; t of Formula (I) is 0; and v of Formula (I) is 4.

With some embodiments, the polyvalent linking group X of Formula (I) is selected from a polyvalent carbosilane having from 2 to 5 Si atoms, and from 1 to 5 methylene groups between each pair of Si atoms.

In accordance with some further embodiments, the polyvalent linking group X of Formula (I) is selected from $S_1$; unsubstituted or substituted $C_1$-$C_{10}$ alkyl, where each $C_1$-$C_{10}$ alkyl substituent is independently selected from —(S$_1$)$_d$—P, where $S_1$, d, and P are each as defined with regard to Formula (II); a siloxane represented by Formula (1), provided below; or a carbosilane represented by Formula (2), provided below.

With reference to the following Formula (1), each $R_6$ is independently selected from methyl, ethyl, or phenyl:

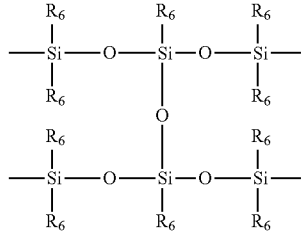
(1)

Formula (1) is a non-limiting example of a branched polyvalent siloxane from which X of Formula (I) can be selected, with some embodiments.

The polyvalent linking group X of Formula (I), with some embodiments, is represented by Formula (1), where each $R_6$ is independently selected from methyl or phenyl.

With reference to the following Formula (2), $R_7$ is a divalent aliphatic group having from 1 to 5 carbon atoms, and each $R_8$ is independently selected from methyl, ethyl, or phenyl.

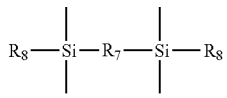
(2)

The polyvalent linking group X of Formula (I), with some embodiments, is represented by Formula (2), where: $R_7$ is a divalent $C_1$-$C_5$ alkyl group; and each $R_8$ is independently selected from methyl, ethyl, or phenyl. With some embodiments, $R_7$ of Formula (2) is —$CH_2CH_2$—.

With some embodiments of the present invention, and with reference to Formula (I): subscript t is 0; subscript v is 4; and X is a siloxane represented by the following Formula (1a):

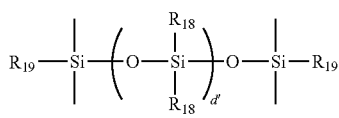
(1a)

With reference to Formula (1a), d' is from 0 to 3; each $R_{18}$, independently for each d', is independently selected from methyl, ethyl, or phenyl; and each $R_{19}$ is independently selected from methyl, ethyl, or phenyl. With further reference for Formula (1a), each of the four single bonds, having an unsatisfied valence extending from the two Si atoms, independently represent a single bond to an -L-[Mesogen] group (or portion) of Formula (I).

With some embodiments of the present invention, and with reference to Formula (I), subscript t is 0; subscript v is 4; and X is a carbosilane represented by the following Formula (2a):

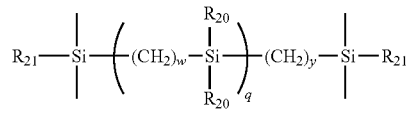
(2a)

With reference to Formula (2a), q is from 0 to 3 (such as 1 to 3); independently for each q, w is from 1 to 3; each $R_{20}$, independently for each q, is independently selected from methyl, ethyl, or phenyl; y is from 1 to 3; and each $R_{21}$ is independently selected from methyl, ethyl, or phenyl. With further reference for Formula (2a), each of the four single bonds, having an unsatisfied valence extending from the two Si atoms, independently represent a single bond to an -L-[Mesogen] group (or portion) of Formula (1).

With some embodiments of the present invention, and with reference to Formula (I), subscript t is 0; subscript v is 4; and X is represented by the following Formula (3),

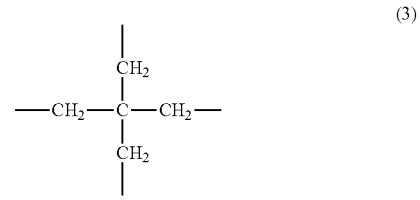
(3)

With some embodiments of the present invention, and with reference to Formula (I). subscript t is 0; subscript v is 3; and X is represented by the following Formula (4),

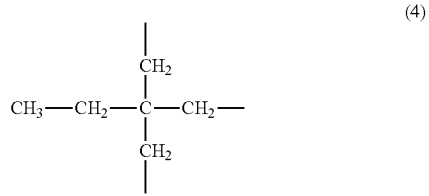
(4)

With some embodiments of the present invention, and with reference to Formula (I), subscript t is 0; subscript v is 4; and X is represented by the following Formula (5),

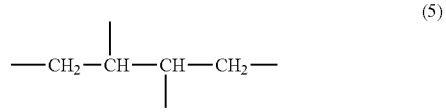
(5)

With further reference to Formula (I), and in accordance with some embodiments, the polyvalent linking group X is Si; t is 1; $R_4$ is —$(S_1)_d$—P, where $S_1$, d, and P are each as defined with regard to Formula (II); and subscript v is 3. With additional reference to Formula (I), and in accordance with some embodiments, the polyvalent linking group X is Si; t is 1; $R_4$ is —$(S_1)_d$—P, where subscript d is 0, and P is alkyl, such as $C_1$-$C_4$ alkyl; and subscript v is 3. With some additional embodiments of the present invention, and with reference to Formula (I), t is 1; $R_4$ is $C_3H_7$—; subscript v is 3; X is Si; and $R_4$—X is represented by the following Formula (6),

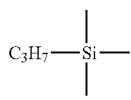

(6)

With reference to Formula (I), and in accordance with some embodiments, the polyvalent linking group X is P (i.e., phosphorous); subscript t is 1; $R_4$ is =O; and subscript v is 3. With some further embodiments of the present invention, and with reference to Formula (I), subscript t is 1; $R_4$ is =O; subscript v is 3; X is P (i.e., phosphorous); and $R_4$—X is represented by the following Formula (7),

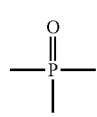

(7)

With some embodiments of the present invention, t of Formula (I) is 0, 1, or 2. With some further embodiments, t is 2, and two $R_4$ groups together define a double bonded oxygen group (i.e., =O).

With reference to Formula (I), the bond between X and $R_4$ is depicted as a single bond, but can be a double bond, with some embodiments, depending on what $R_4$ is selected from. For purposes of illustration, when $R_4$ is selected from =O, the bond between X and $R_4$ is a double bond (=). For purposes of further illustration, when $R_4$ is selected from —$(S_1)_d$—P, the bond between X and $R_4$ is a single bond (—).

In accordance with some embodiments of the present invention, for at least one Mesogen, P of Formula (II) is in each case independently selected from acrylate, methacrylate, trihalomethacrylate, cyanoacrylate, oxirane, hydroxyl, primary amino, carboxylic acid, carboxylic acid ester, siloxane, carbosilane, cyano, or nitro.

With some further embodiments of the present invention, each Mesogen of Formula (I), independently for each v, is represented by the following Formula (IV),

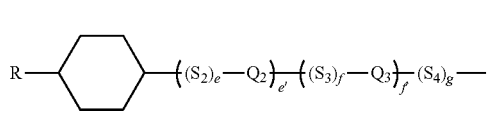

(IV)

With reference to Formula (IV), and in accordance with some further embodiments, R is selected from hydrogen, halogen, alkyl, haloalkyl, alkoxy, and haloalkoxy; and $S_2$, $S_3$, $S_4$, $Q_2$, $Q_3$, e', f', e, f, and g are each independently as defined and described previously herein with regard to Formula (II).

In accordance with some embodiments of the present invention, at least one Mesogen of Formula (I), independently for each v, is represented by Formula (IV).

With some embodiments of the present invention, at least one Mesogen of Formula (I), for at least one subscript v and for less than all subscript v's, is in each case independently represented by Formula (II), in which P of Formula (II) is selected from acrylate, methacrylate, trihalomethacrylate, cyanoacrylate, oxirane, hydroxyl, primary amino, carboxylic acid, carboxylic acid ester, siloxane, carbosilane, cyano, or nitro. In further accordance with such embodiments, at least one Mesogen of Formula (I), for at least one subscript v and for less than all subscript v's, is in each case independently represented by Formula (IV) above, where: R is selected from hydrogen, halogen, alkyl, haloalkyl, alkoxy, or haloalkoxy; and $S_2$, $S_3$, $S_4$, $Q_2$, $Q_3$, e', f', e, and f are each independently as defined and described previously herein with regard to Formula (II).

For purposes of non-limiting illustration, the terminal R-substituted divalent 1,4-cyclohexyl portion of Formula (IV),

is derived from the -$Q_1$-$(S_1)_d$—P terminal portion of Formula (II), where $Q_1$ is a divalent 1,4-cyclohexyl group; subscript d is 0; and P is selected from hydrogen, halogen, alkyl, haloalkyl, alkoxy, or haloalkoxy (designated as R).

With some additional embodiments of the mesogen-containing compounds of the present invention, and with reference to Formula (I), for each subscript v, each Mesogen is the same.

With reference to Formula (I), and in accordance with some embodiments, each Mesogen, for each subscript v, includes at least four cyclic groups.

With reference to Formula (I), and in accordance with some embodiments, each linking group -L-, independently for each subscript v, includes an average chain length of at least 25 bonds, or at least 30 bonds, such as 25 to 200 bonds (or 30 to 200 bonds, or 35 to 200 bonds); or 25 to 150 bonds (or 30 to 150 bonds, or 35 to 150 bonds); or 25 to 100 bonds (or 30 to 100 bonds, or 35 to 100 bonds); or 25 to 80 bonds (or 30 to 80 bonds, or 35 to 80 bonds); or 25 to 75 bonds (or 30 to 75 bonds, or 35 to 75 bonds); or 25 to 70 bonds (or 30 to 70 bonds, or 35 to 70 bonds); or 25 to 60 bonds (or 30 to 60 bonds, or 35 to 60 bonds); or 25 to 45 bonds (or 30 to 45 bonds, or 35 to 45 bonds), where each bond is independently selected from a single bond, a double bond, or a triple bond.

With further reference to Formula (I), and in accordance with some embodiments, each linking group -L-, for each subscript v, is in each case free of mesogen properties.

In accordance with some embodiments, and with reference to Formula (I), each linking group -L-, for each subscript v, is in each case independently selected from the following Formulas L(1) through L(10), including combinations of two or more thereof:

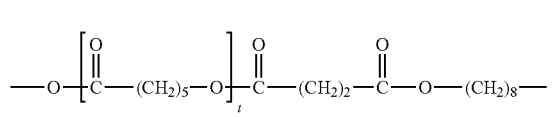

L(1)

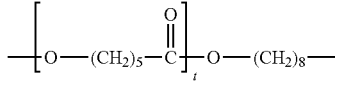

L(2)

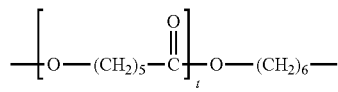
L(3)

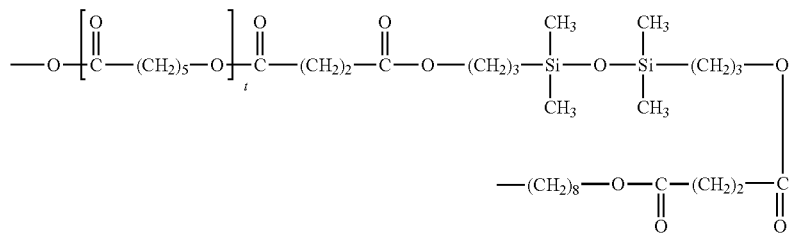
L(4)

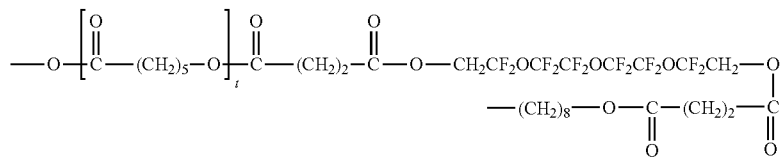
L(5)

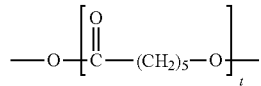
L(6)

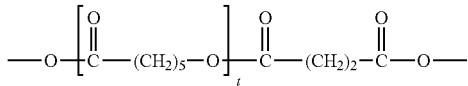
L(7)

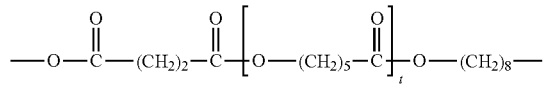
L(8) L(9)

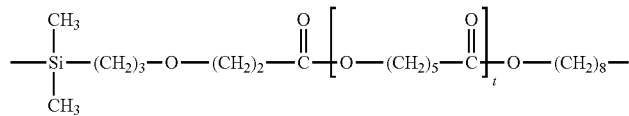
L(10)

With reference to Formulas L(1) through L(10), each t, for each occurrence, is independently from 1 to 20.

The present invention relates to a liquid crystal composition that includes the mesogen-containing compound(s) of the present invention, such as described with reference to Formula (I). Liquid crystal compositions according to the present invention, in some embodiments, in addition to at least one compound represented by Formula I, can further include at least one of a photochromic compound, a dichroic compound, and/or a photochromic-dichroic compound.

Classes of photochromic compounds that can be present in the liquid crystal compositions of the present invention include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and mixtures thereof.

Photochromic-dichroic compounds that can be present in the liquid crystal compositions of the present invention typically include at least one photochromic moiety; and at least one covalently bonded lengthening group, which can include at least one mesogenic segment. With some embodiments, each photochromic moiety of the photochromic-dichroic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations thereof.

Classes and examples of lengthening groups of the photochromic-dichroic compounds that can be included in the liquid crystal compositions of the present invention include, but are not limited to, those described at columns 37-51 of U.S. Pat. No. 9,334,439 B2, which disclosure is incorporated herein by reference.

Liquid crystal compositions according to the present invention can optionally further include at least one additive. Examples of such optional additives include, but are not limited to, liquid crystal materials, liquid crystal property control additives, non-linear optical materials, dyes (e.g., static dyes), dichroic dyes, blue light blocking (or filtering) agents, alignment promoters, kinetic enhancers, photoinitiators, thermal initiators, surfactants, polymerization inhibitors, solvents, light stabilizers, thermal stabilizers, mold release agents, rheology control agents, gelators, leveling agents, free radical scavengers, coupling agents, tilt control additives, block or non-block polymeric materials, and/or adhesion promoters. Classes and examples of blue light blocking (or filtering) agents include, but are not limited to, those described in U.S. Pat. No. 9,683,102 B2 and US 2015/0234208 A1, the pertinent portions of which are incorporated herein by reference.

Examples of dichroic dyes that can be included in the liquid crystal compositions of the present invention include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine, iodates, or combinations of two or more thereof.

In accordance with the present invention, there is further provided an optical element that includes a substrate; and a layer on (or over) at least a portion of a surface of the substrate, in which the layer includes at least one mesogen-containing compound according to the present invention.

The substrate of the optical element, with some embodiments, is an optical substrate, which can include organic materials (such as organic polymers), inorganic materials, or combinations thereof (for example, composite materials). Examples of substrates that can be included in the optical elements of the present invention include, but are not limited to, those described at column 35, line 5 through column 36, line 57 of U.S. Pat. No. 8,628,685 B2, which disclosure is incorporated herein by reference.

The layer(s) provided over the substrate of the optical elements of the present invention include, with some embodiments, an organic matrix, such as an organic polymer matrix, which can be a cured (or crosslinked) organic matrix, or a thermoplastic organic matrix. Correspondingly, each layer of the optical elements of the present invention can be selected from cured (or crosslinked) layers and thermoplastic layers. The organic matrix of each layer of the optical elements of the present invention can include linkages such as, but not limited to, ether linkages; carboxylic acid ester linkages; urethane linkages; amide linkages; urea linkages; carbonate linkages; linkages formed from the radical polymerization of radically polymerizable ethylenically unsaturated groups, such as, but not limited to, vinyl groups, allyl groups, and/or (meth)acrylate groups; and combinations of two or more thereof.

Each layer of the optical elements of the present invention can be formed by art-recognized methods, such as, but not limited to, lamination methods and coating methods. Coating methods include, but are not limited to, spray coating methods; spin coating methods; curtain coating methods; dip coating methods; micro-jet coating methods (such as ink-jet coating methods); in-mold coating methods; and combinations thereof. Lamination methods include, but are not limited to, extrusion lamination methods (such as directly over the substrate); in-mold lamination methods (in which a laminate is placed in a mold, and the substrate is formed there-against within the mold); thermal lamination methods (in which a laminate is thermally fused over the substrate); adhesive lamination methods (in which the laminate is adhered over the substrate by an interposed adhesive layer); and combinations thereof.

With some embodiments of the present invention, the optical element further includes an alignment layer interposed between the substrate and the layer (which includes a mesogen-containing compound of the present invention), in which the alignment layer is at least partially alignable by exposure to at least one of a magnetic field, an electric field, linearly polarized radiation, shear force, or combinations of two or more thereof. Classes and examples of materials that can be used as or to form the alignment layer include, but are not limited to, the orientation facilities, orientation materials, alignment media, and alignment facilities described at column 5, line 5 through column 6, line 4; column 7, line 56 through column 24, line 36; and the examples of U.S. Pat. No. 8,926,091 B2, which disclosure is incorporated herein by reference.

The optical element of the present invention can, with some embodiments, include one or more additional layers, such as, but not limited to, primer layer(s), antireflective layer(s), protective layer(s), hardcoat layer(s), and polarizing layer(s). Classes and examples of such additional optional layers are described at column 20, line 30 through column 21, line 38 of U.S. Pat. No. 8,828,284 B2, which disclosure is incorporated herein by reference.

With some embodiments, the optical element of the present invention is selected from an ophthalmic element, a display element, a window, a mirror, and a liquid crystal cell element.

With some further embodiments, the ophthalmic element of the present invention is selected from a corrective lens, a non-corrective lens, a contact lens, an intra-ocular lens, a magnifying lens, a protective lens, and a visor.

The present invention can be further characterized by one or more of the following non-limiting clauses.

Clause 1: A mesogen-containing compound represented by the following Formula (I),

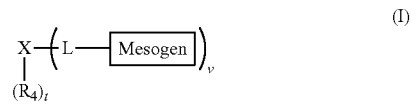

wherein,
v is 3 or 4,
t is 0 or 1,
(A) each Mesogen, independently for each v, is represented by the following Formula (II),

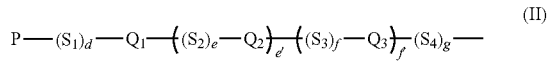

wherein for Formula (II),
P is selected from hydrogen, halogen, alkyl, haloalkyl, alkoxy, haloalkoxy, acrylate, methacrylate, trihalomethacrylate, cyanoacrylate, acrylamido, methacrylamido, oxirane, hydroxyl, primary amino, carboxylic acid, carboxylic acid ester, siloxane, carbosilane, cyano, or nitro;
$S_1$, $S_2$, $S_3$, and $S_4$, for each occurrence, are independently selected from a spacer unit chosen from —$CH_2$—; —O—; —C(O)—; —N=N—; —CH=CH—; —C≡C—; —CH=N—; —$CF_2$—; or —NH—, provided that when two spacer units comprising heteroatoms are linked together the spacer units are linked so that heteroatoms are not directly linked to each other;
d is 0 to 20;
e, f, and g, for each occurrence, are independently 0 to 3;
$Q_1$, $Q_2$, and $Q_3$, for each occurrence, are independently a divalent group selected from the group consisting of unsubstituted or substituted cycloaliphatic group; unsubstituted or substituted heterocycloaliphatic group; unsubstituted or substituted aryl; and unsubstituted or substituted heteroaryl; wherein each cycloaliphatic group substituent, each heterocycloaliphatic group substituent, each aryl substituent, and each heteroaryl substituent is in each case independently selected from —$(S_1)_d$—P, where $S_1$, d, and P are each as defined with regard to Formula (II); and e' and f', for each occurrence, are independently from 0 to 6, provided the sum of e' and f' is at least 2;

(B) each -L-, independently for each v, is represented by the following Formula (III),

$$—(A—B)_y—E—\quad (III)$$

wherein,
(i) y is 0 to 30;
(ii) each A independently for each y is a divalent group selected from the group consisting of single bond, aliphatic group, and haloaliphatic group;
(iii) each B independently for each y is a divalent group selected from the group consisting of —O—; —C(O)O—; —OC(O)O—; —C(O)N($R_1$)— where $R_1$ is H or alkyl; —NH—C(O)O—; —N($R_2$)C(O)N($R_2$)— where each $R_2$ is independently selected from H or alkyl;

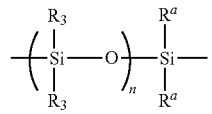

where n is 1 to 4, each $R^a$ is independently methyl, ethyl, or phenyl, and each $R_3$ independently for each n is independently selected from methyl, ethyl, or phenyl;

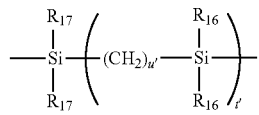

where t' is from 1 to 4, u' is from 1 to 5 independently for each t', each $R_{16}$ independently for each t' is independently selected from methyl, ethyl, or phenyl, and each $R_{17}$ is independently selected from methyl, ethyl, or phenyl; and —Si($R_5$)($R_5$)— where each $R_5$ is independently selected from methyl, ethyl, or phenyl; and
(iv) E is a divalent group selected from the group consisting of aliphatic group and haloaliphatic group;
(C) X is a polyvalent group selected from the group consisting of Si; N; Ge; P; siloxane having from 2 to 6 Si atoms; carbosilane having from 2 to 5 Si atoms, and from 1 to 5 methylene groups between each pair of Si atoms; unsubstituted or substituted aliphatic group having from 1 to 10 carbon atoms; unsubstituted or substituted cycloaliphatic group; unsubstituted or substituted heterocycloaliphatic group; unsubstituted or substituted aryl group; and unsubstituted or substituted heteroaryl group; wherein each aliphatic group substituent, each cycloaliphatic group substituent, each heterocycloaliphatic group substituent, each aryl substituent, and each heteroaryl substituent is in each case independently selected from —$(S_1)_d$—P, where $S_1$, d, and P are each as defined with regard to Formula (II); and (D) $R_4$ is selected from the group consisting of —$(S_1)_d$—P, where $S_1$, d, and P are each as defined with regard to Formula (II); =O; and unsubstituted or substituted phenyl group, wherein each phenyl substituent is independently selected from —$(S_1)_d$—P, where $S_1$, d, and P are each as defined with regard to Formula (II), provided that at least one Mesogen includes at least four cyclic groups, and provided that each -L- independently comprises an average chain length of at least 15 bonds, and further provided that at least one -L- comprises an average chain length of at least 25 bonds.

Clause 2: The mesogen-containing compound of clause 1, wherein independently for each Mesogen, and independently for each Formula (II), $Q_1$, $Q_2$, and $Q_3$, for each occurrence, are independently a divalent group selected from the group consisting of unsubstituted or substituted cycloalkyl; unsubstituted or substituted phenyl; unsubstituted or substituted naphthyl; and unsubstituted or substituted triptycenyl, wherein each cycloalkyl substituent, each phenyl substituent, each naphthyl substituent, and each triptycenyl substituent is in each case independently selected from —$(S_1)_d$—P, where $S_1$, d, and P are each as defined with regard to Formula (II), and X is a polyvalent group selected from the group consisting of $S_1$; siloxane having from 2 to 6 Si atoms; carbosilane having from 2 to 5 Si atoms, and from 1 to 5 methylene groups between each pair of Si atoms; and unsubstituted or substituted aliphatic group having from 1 to 10 carbon atoms, wherein each aliphatic group substituent is independently selected from —$(S_1)_d$—P, where $S_1$, d, and P are each as defined with regard to Formula (II).

Clause 3: The mesogen-containing compound of clauses 1 or 2, wherein independently for each Mesogen, and independently for each Formula (II), $Q_1$, $Q_2$, and $Q_3$ for each occurrence, are independently a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; and unsubstituted or substituted 1,8-naphthyl, wherein each 1,4-cycloalkyl substituent, each 1,4-phenyl substituent, each 1,5-naphthyl substituent, each 2,6-naphthyl substituent, and each 1,8-naphthyl substituent is in each case independently selected from —$(S_1)_d$—P, where $S_1$, d, and P are each as defined with regard to Formula (II), and X is a polyvalent group selected from the group consisting of $S_1$; unsubstituted or substituted $C_1$-$C_{10}$ alkyl, wherein each $C_1$-$C_{10}$ alkyl substituent is independently selected from —$(S_1)_d$—P, where $S_1$, d, and P are each as defined with regard to Formula (II); siloxane represented by the following Formula (1); and carbosilane represented by the following Formula (2), (1)

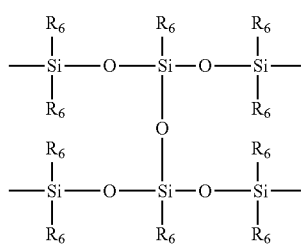

wherein for Formula (1), each $R_6$ is independently selected from methyl, ethyl, or phenyl, (2)

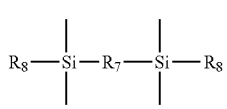

wherein for Formula (2), $R_7$ is a divalent aliphatic group having from 1 to 5 carbon atoms, and each $R_8$ is independently selected from methyl, ethyl, or phenyl.

Clause 4: The mesogen-containing compound of any one of clauses 1 to 3, wherein
independently for each Mesogen, and independently for each Formula (II),
P is selected from hydrogen, alkyl, alkoxy, acrylate, or methacrylate;
for Formula (III),
(i) y is 1 to 30;
(ii) each A independently for each y is a divalent group selected from the group consisting of alkyl and haloalkyl;
(iii) each B independently for each y is a divalent group selected from the group consisting of —O—; —C(O)O—; —OC(O)O—; —C(O)N($R_1$)— where $R_1$ is H or alkyl; —NH—C(O)O—; —N($R_2$)C(O)N($R_2$)— where each $R_2$ is independently selected from H or alkyl;

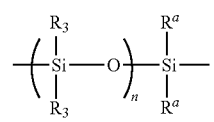

where n is 1 to 4, each $R^a$ is independently methyl, ethyl, or phenyl, and each $R_3$ independently for each n is independently selected from methyl, ethyl, or phenyl; and —Si($R_5$)($R_5$)— where each $R_5$ is independently selected from methyl or phenyl; and
(iv) E is a divalent group selected from the group consisting of alkyl groups and haloalkyl groups.

Clause 5: The mesogen-containing compound of any one of clauses 1 to 3, wherein for at least one Mesogen, P of Formula (II) is in each case independently selected from acrylate, methacrylate, trihalomethacrylate, cyanoacrylate, oxirane, hydroxyl, primary amino, carboxylic acid, carboxylic acid ester, siloxane, carbosilane, cyano, or nitro.

Clause 6: The mesogen-containing compound of any one of clauses 1 to 3 or 5, wherein at least one Mesogen, independently for each v, is represented by the following Formula (IV), (IV)

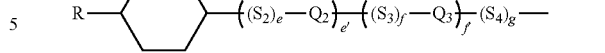

wherein R is selected from hydrogen, halogen, alkyl, haloalkyl, alkoxy, or haloalkoxy, and
$S_2$, $S_3$, $S_4$, $Q_2$, $Q_3$, e', f', e, f, and g are each independently as defined with regard to Formula (II).

Clause 7: The mesogen-containing compound of any one of clauses 1 to 3 or 6, wherein
each Mesogen, independently for each v, is represented by the following Formula (IV), (IV)

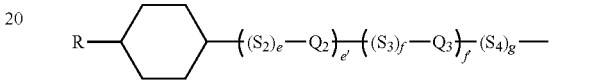

wherein R is selected from hydrogen, halogen, alkyl, haloalkyl, alkoxy, or haloalkoxy, and
$S_2$, $S_3$, $S_4$, $Q_2$, $Q_3$, e', f', e, f, and g are each independently as defined with regard to Formula (II).

Clause 8: The mesogen-containing compound of any one of clauses 1 to 3, 5, or 6, wherein
at least one Mesogen, for at least one v and for less than all v's, is in each case independently represented by Formula (II), wherein
P of Formula (II) is selected from acrylate, methacrylate, trihalomethacrylate, cyanoacrylate, oxirane, hydroxyl, primary amino, carboxylic acid, carboxylic acid ester, siloxane, carbosilane, cyano, or nitro; and
at least one Mesogen, for at least one v and for less than all v's, is in each case independently represented by the following Formula (IV), (IV)

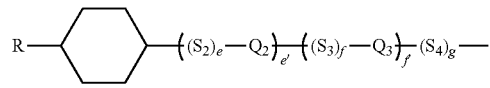

wherein R is selected from hydrogen, halogen, alkyl, haloalkyl, alkoxy, or haloalkoxy, and
$S_2$, $S_3$, $S_4$, $Q_2$, $Q_3$, e', f', e, f, and g are each independently as defined with regard to Formula (II).

Clause 9: The mesogen-containing compound of any one of clauses 1 to 3, 5, or 6, wherein the siloxane, from which P of Formula (II) is selected, is represented by the following Formula (A), (A)

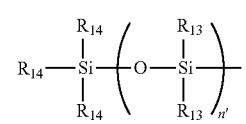

wherein for Formula (A): n' is from 1 to 4; independently for each n', each $R_{13}$ is independently selected from methyl, ethyl, or phenyl; and each $R_{14}$ is independently selected from methyl, ethyl, or phenyl.

Clause 10: The mesogen-containing compound of any one of clauses 1 to 3, 5, 6, 8, or 9, wherein the carbosilane, from which P of Formula (II) is selected, is represented by the following Formula (B),

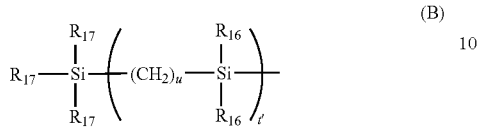

wherein for Formula (B): t' is from 1 to 4; independently for each t', u is from 1 to 5; independently for each t', each $R_{16}$ is independently selected from methyl, ethyl, or phenyl; and each $R_{17}$ is selected from methyl, ethyl, or phenyl.

Clause 11: The mesogen-containing compound of any one of clauses 1, 2, or 4 to 10, wherein for Formula (I), t is 0, v is 3, and X is a trivalent cyclotrisiloxane represented by the following Formula (C):

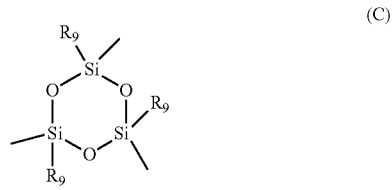

wherein for Formula (C), each $R_9$ is independently methyl, ethyl, or phenyl.

Clause 12: The mesogen-containing compound of any one of clauses 1, 2, or 4 to 10, wherein for Formula (I), t is 0, v is 4, and X is a tetravalent cyclotetrasiloxane represented by the following Formula (D):

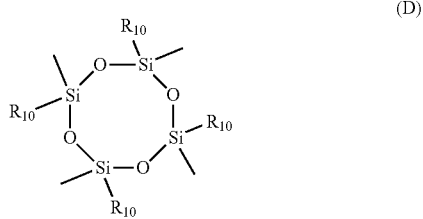

wherein for Formula (D), each $R_{10}$ is independently methyl, ethyl, or phenyl.

Clause 13: The mesogen-containing compound of any one of clauses 1, 2, or 4 to 10, wherein for Formula (I), t is 0, v is 4, and X is a tetravalent siloxane represented by the following Formula (1a):

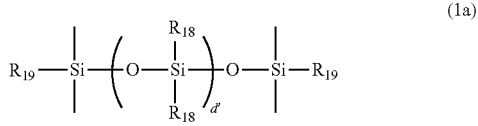

wherein for Formula (1a) d' is from 0 to 3; each $R_{18}$, independently for each d', is independently selected from methyl, ethyl, or phenyl; and each $R_{19}$ is independently selected from methyl, ethyl, or phenyl.

Clause 14: The mesogen-containing compound of any one of clauses 1, 2, or 4 to 10, wherein for Formula (I), t is 0, v is 4, and X is a tetravalent carbosilane represented by the following Formula (2a):

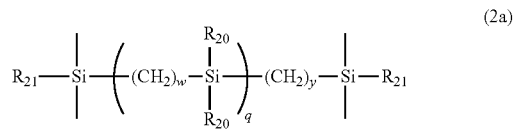

wherein for Formula (2a) q is from 0 to 3 (such as 1 to 3); independently for each q, w is from 1 to 3; each $R_{20}$, independently for each q, is independently selected from methyl, ethyl, or phenyl; y is from 1 to 3; and each $R_{21}$ is independently selected from methyl, ethyl, or phenyl.

Clause 15: The mesogen-containing compound of any one of clauses 1 to 14, wherein for each v, each Mesogen is the same.

Clause 16: The mesogen-containing compound of any one of clauses 1 to 15, wherein each -L-, independently for each v, comprises an average chain length of at least 25 bonds, or at least 30 bonds.

Clause 17: The mesogen-containing compound of any one of clauses 1 to 16, wherein each -L-, independently for each v, comprises an average chain length of 25 to 200 bonds, or 30 to 150 bonds, or 35 to 100 bonds.

Clause 18: The mesogen-containing compound of any one of clauses 1 to 17, wherein each -L-, independently for each v, is selected from Formula L(1) through Formula L(10), including combinations of two or more thereof, as described previously herein.

Clause 19: A liquid crystal composition comprising the mesogen-containing compound of any one of clauses 1 to 18.

Clause 20: The liquid crystal composition of clause 19, further comprising at least one of a photochromic compound, a dichroic compound, or a photochromic-dichroic compound.

Clause 21: The liquid crystal composition of clause 20, wherein said photochromic-dichroic compound comprises at least one photochromic moiety, and said photochromic compound and each photochromic moiety of said photochromic-dichroic compound are in each case independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline) naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and mixtures thereof.

Clause 22: An optical element comprising:
a substrate; and
a layer on at least a portion of a surface of said substrate, wherein said layer comprises the mesogen-containing compound of any one of clauses 1 to 18.

Clause 23: The optical element of clause 22, further comprising an alignment layer interposed between said substrate and said layer, wherein said alignment layer is at least partially alignable by exposure to at least one of a magnetic field, an electric field, linearly polarized radiation, shear force, or combinations of two or more thereof.

Clause 24: The optical element of clause 23, wherein said optical element is selected from a display element, a window, a mirror, a liquid crystal cell element, and an ophthalmic element.

Clause 25: The optical element of clause 24, wherein said ophthalmic element is selected from a corrective lens, a non-corrective lens, a contact lens, an intra-ocular lens, a magnifying lens, a protective lens, and a visor.

The present invention is more particularly described in the following examples, which are intended as illustrative only, since numerous modifications and variations therein will be apparent to those skilled in the art.

EXAMPLES

In Part 1 of the following examples there is described the preparation of intermediate mesogen-containing segments, ——[Mesogen].

In Part 2 there is described the preparation of intermediate central segments or portions, which each include a polyvalent non-mesogenic core X, having bonded thereto v linking groups -L- and t $R_4$ groups. In Part 3 there is described the preparation of mesogen-containing compounds according to the present invention, and comparative mesogen-containing compounds. In Part 4 there is described the preparation of liquid crystal coating formulations. In Part 5 there is described the preparation of coated substrates (test specimens). In Part 6 there is described photochromic performance testing of the coated substrates of Part 5, and test results thereof.

Part 1

The preparation of intermediate mesogen-containing segments S1 through S10 is described as follows. Representative structures of the intermediate mesogen-containing segments S1 through S10 are provided in Table 1.

Segment S1

Segment S1 was prepared in accordance with Example 1, step 8 of United States Patent Application Publication No. US 2017/0275534 A1.

Segment S2

To a one-neck, round bottom flask containing Segment S1 (400 g) and succinic anhydride (74.0 g) was added toluene (1.5 L) and triethylamine ("Et₃N," 15.0 mL). The suspension was heated to 80° C. and stirred for 5 hours. The reaction mixture was poured into hot ethyl acetate ("EtOAc," 1.5 L, 65° C.) while stirring, then the flask was rinsed with tetrahydrofuran ("THF," 100 mL). The resulting solution was allowed to cool to room temperature and crystallized overnight to yield 410 g of product (yield 88%). $^1$H NMR showed that the product had a structure consistent with 4-oxo-4-((8-(4-((4-((4'-pentyl-[1,1'-bi(cyclohexane)]-4-carbonyl)oxy)phenoxy)carbonyl)phenoxy)octyl)oxy)butanoic acid.

Segment S3

Segment S1 (25.0 g) and F-caprolactone (18.5 g) were suspended in dichloromethane ("DCM," 100 mL) before diphenyl phosphate ("DPP," 2.52 g) was added in one portion. After stirring at room temperature for 6 hours, the crude reaction solution was washed with HCl (1 M, 2×100 mL), NaOH (5% aq wt/vol, 2×100 mL), and brine (2×50 mL). The organic phase was then dried over MgSO₄ then filtered through celite. The filtrate was passed through a silica gel plug topped with celite using 10% EtOAc in DCM as eluent. The material was concentrated to an off-white, waxy solid before being dissolved in DCM (1 mL/g). The solution was filtered through celite to remove insoluble materials. The solution was concentrated to 50 mL before being slowly added to cold hexanes (0° C., 430 mL). Yield: 37.18 g.

Segment S4

Segment S4 was prepared following the procedures of Steps 1 through 6 of Example 2 of U.S. Pat. No. 8,349,210 B2 except substituting 6-chlorohexan-1-ol in place of 3-chloropropan-1-ol in Step 1, and 8-chlorooctan-1-ol in place of 6-chlorohexan-1-ol in Step 3.

Segment S5

Segment S5 was prepared using the procedures of Segment S2, replacing Segment S1 with an equimolar amount of Segment S4.

Segment S6

Segment S6 was prepared using the procedure for Segment S3 except that Segment S4 was used in place of Segment S1 and 8 molar equivalents of F-caprolactone were used.

Segment S7

Segment S7 was prepared using the procedures of Steps 1 and 2 of Example 7 of United States Patent Application Publication No. US 2017/0275534A1.

Segment S8

Segment S8 was prepared in accordance with Example 8, Step 2 in United States Patent Application Publication No. 2012/0002141A1.

Segment S9

To a solution of Segment S2 (21.6 g), bis(hydroxypropyl) tetramethyldisiloxane (15.0 g), and 2-(dimethylamino)pyridinium p-toluenesulfonate ("DPTS," 0.9 g) in DCM was added N,N'-dicyclohexylcarbodiimide ("DCC," 7.4 g) over 5 hours. 1,3-Dicyclohexylurea ("DCU") was removed and the material chromatographed using DCM-EtOAC (50:1 to 10:1) to give the desired product. Yield: 14.0 g.

Segment S10

Synthesis of Segment S10 was accomplished following a procedure similar to Segment S9 using the following amounts: Segment S2 (21.6 g), 1H,1H,11H,11H-perfluoro-3,6,9-trioxaundecane-1,11-diol (24.6 g), DPTS (0.9 g), DCM, and DCC (7.4 g). Yield: 22.0 g.

TABLE 1

Representative Structures of
Intermediate Mesogen-Containing Segments S1 through S10.

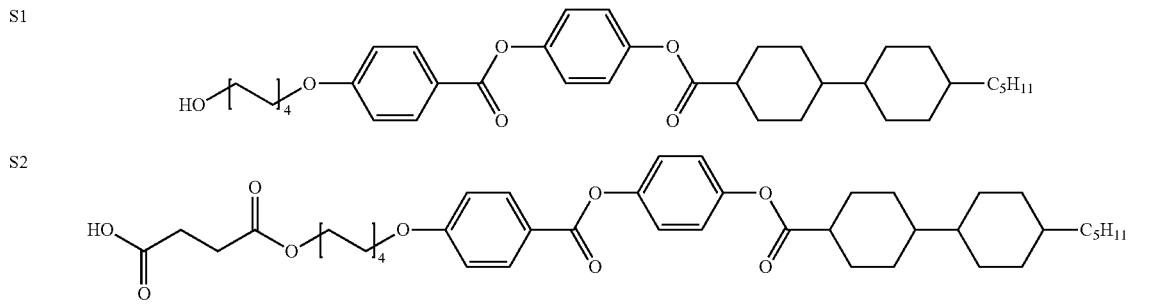

TABLE 1-continued

Representative Structures of
Intermediate Mesogen-Containing Segments S1 through S10.

S3 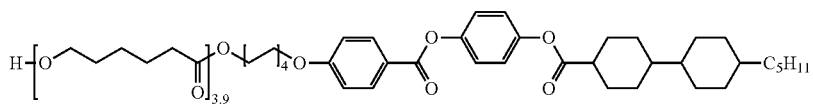

S4 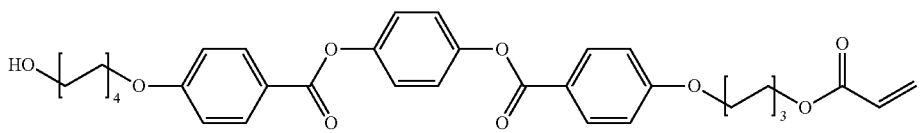

S5 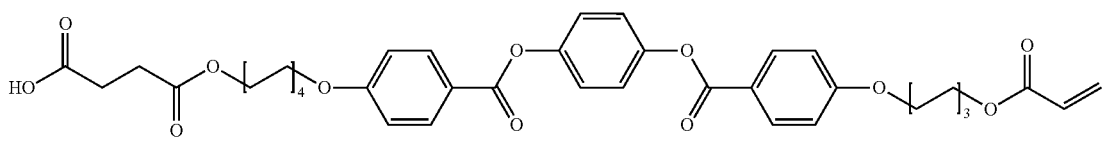

S6 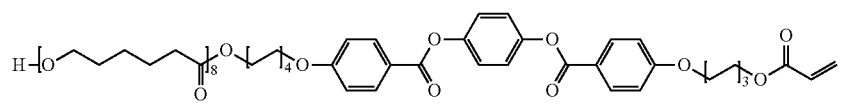

S7 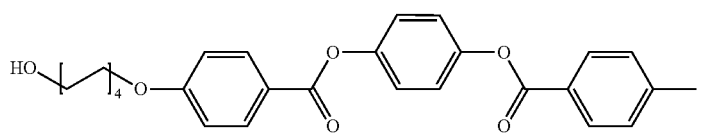

S8 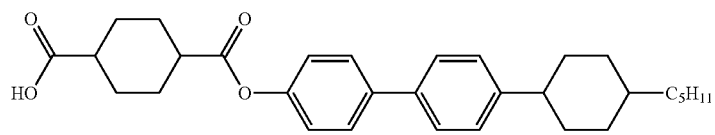

S9 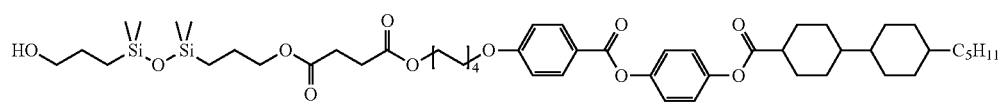

S10 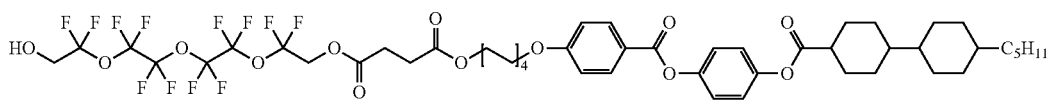

Part 2

As follows, there is described the preparation of intermediate central segments (or portions) C1 through C4, which each include a polyvalent non-mesogenic core X, having bonded thereto v linking groups -L- and t $R_4$ groups. Representative structures of the intermediate central segments C1 through C4 are provided in Table 2.

Segment C1

2-Ethyl-2-(hydroxymethyl)-1,3-propanediol (7.42 g) and ε-caprolactone (75.9 g) were put into a nitrogen purged flask, heated to 150° C. until homogeneous, then tin(II) 2-ethylhexanoate (0.83 g) was added. The resulting mixture was stirred at 150° C. under nitrogen for 24 hours. To the cooled reaction mixture was stirred with hexanes (300 mL) then decanted. This process was repeated three times yielding a viscous liquid which was dried under vacuum. Yield: 84 g.

Segment C2

A solution of Segment C1 (43.0 g), succinic anhydride (8.8 g), Et$_3$N (5 mL) and toluene (200 mL) were heated at 90° C. for 6 hours. The solvent was removed under reduced pressure and the resulting solid was used without further purification.

Segment C3

Step 1

Step 1 was accomplished following a procedure similar to Segment C1 using the following amounts: pentaerithritol (7.54 g), F-caprolactone (50.6 g), tin(II) 2-ethylhexanoate (1.0 mL). Yield: 58.0 g.

Step 2

The product from Step 1 above was subjected to the same reaction conditions described for Segment S2 above to yield Segment C3 except the product was purified in a similar manner as described in Segment C1 above. Yield: 80.0 g.

Segment C4

Synthesis of Segment C4 was accomplished following a procedure similar to Segment S2 using the following amounts: pentaerithritol (5.0 g), succinic anhydride (18.3 g), Et$_3$N (5.0 mL), toluene (100 mL). Yield: 15.0 g.

TABLE 2
Representative Structures of
Intermediate Central Segments C1 through C4.
C1
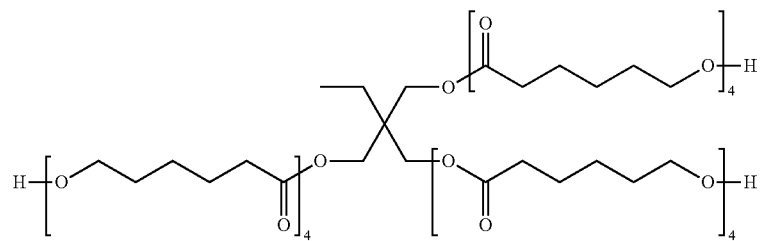
C2
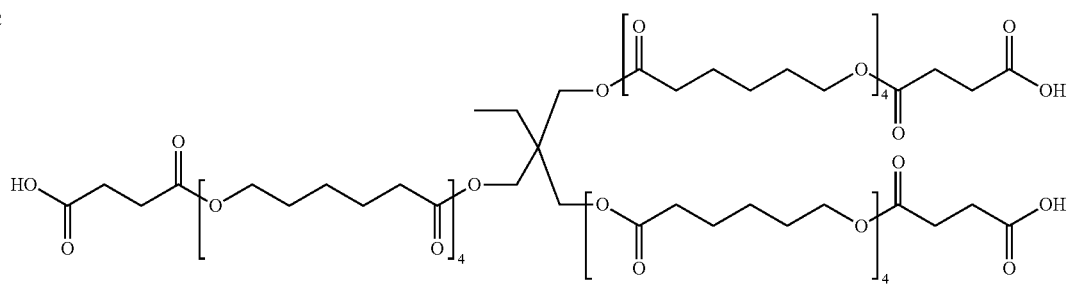
C3
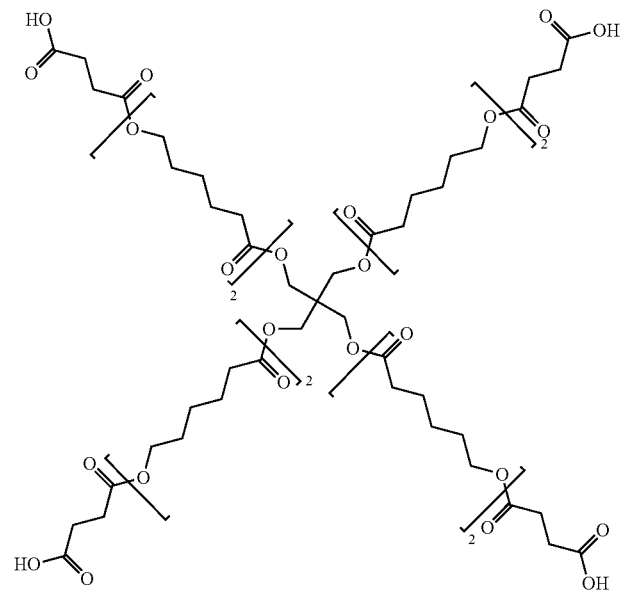
C4
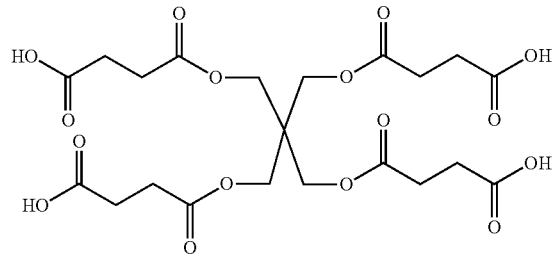 [SMILES: O=C(O)CCC(=O)OCC(COC(=O)CCC(=O)O)(COC(=O)CCC(=O)O)COC(=O)CCC(=O)O]

Part 3

As follows, there is described the preparation of mesogen-containing compounds according to the present invention (Examples 1-4, 6, 9, 10, 12, and 14) and comparative mesogen-containing compounds (Comparative Examples/CE's 5, 7, 8, 11, 13, and 15). Representative structures of the mesogen-containing compounds according to the present invention and the comparative mesogen-containing compounds are provided in Table 8.

Example 1

Step 1

A flask containing 2-(hydroxymethyl)-2-methylpropane-1,3-diol (100.0 g), 2,2-dimethoxypropane (130 g) and 4-toluenesulfonic acid ("TsOH," 4.0 g) in acetone (500 mL) was stirred under nitrogen for 24 hours at room temperature. Aq. NaHCO$_3$ (100 mL, 4.3M) was added. The solution was concentrated, dissolved in 500 mL of DCM and washed with water. The organic layer was passed through a short silica plug and concentrated to yield (2,2,5-trimethyl-1,3-dioxan-5-yl)methanol.

Step 2

To the solution of Segment S5 (14.64 g), the product from Step 1 above (3.52 g), and 4-dimethylaminopyridine (DMAP) (0.48 g) in DCM (100 mL) was added DCC (4.94 g). The resulting mixture was stirred at room temperature for a few hours. The DCU was removed by filtration, and the filtrate was purified via column chromatography.

Step 3

The product from Step 2 above was dissolved in DCM-methanol (MeOH) (1:1, 200 mL) before TsOH (0.8 g) was added. After stirring overnight, the solution was washed with aq. NaHCO$_3$ and brine. The material was chromatographed (eluent was 17-66% EtOAc in DCM).

Step 4

DPP (0.66 g) was added to a solution of the product from Step 3 above (4.4 g) and F-caprolactone (4.81 g) in DCM (100 mL). The solution was stirred at room temperature for 8 hours. DMAP (0.32 g), Segment S2 (8.36 g) and DCC (2.61 g) were added and the reaction continued stirring overnight. The DCU was removed by filtration. The filtrate was washed twice with HCl (1M), NaOH (5% wt./vol.) twice, and brine twice, followed by purification through column chromatography (eluent was DCM ramped to DCM-EtOAc (5:1)).

Example 2

Step 1

Step 1 was accomplished using a procedure similar to Step 1 from Example 1 except 3-hydroxy-2-(hydroxymethyl)-2-methylpropanoic acid was used in place of 2-(hydroxymethyl)-2-methylpropane-1,3-diol and the crude product was washed with ethanolic ammonia instead of aq. NaHCO$_3$. Yield: 35.0 g.

Step 2

The product from Step 1 above (4.53 g), Segment S6 (30.9 g), DPTS (3.12 g), and DCC (5.78 g) were dissolved in DCM (500 mL). After stirring overnight, starting Segment S6 was still present. Another addition of DCC (4.12 g) the product from Step 1 above (3.48 g) was made. Three days later, the mixture was partially concentrated and DCU was removed by filtration. The filtrate was washed with water and brine, dried over MgSO$_4$ and passed through a silica gel plug (eluent was DCM ramped to DCM-EtOAc (5:1)). The resulting material was purified by precipitation from EtOAc-MeOH. Yield: 26.5 g.

Step 3

Step 3 was accomplished following a procedure similar to Step 3 from Example 1 using the following amounts: product from Step 2 above (26.5 g), TsOH (0.6 g), DCM-MeOH (1:1, 200 mL). Yield: 16.0 g.

Step 4

Synthesis of Example 2 was completed using a procedure similar to Step 2 from Example 1 above using the following amounts: product from Step 3 above (3.09 g), Segment S2 (3.17 g), DMAP (0.1 g), DCC (1.0 g), and DCM (100 mL). Yield: 2.5 g, 41%.

Examples 3, 4 and CE-5

The mesogen-containing compounds of Examples 3, 4, and CE-5 were prepared in accordance with the following general procedure.

As summarized in the following Table 3, one molar equivalent of a trifunctional carboxylic acid (Tri-COOH) intermediate central segment (C2), three molar equivalents of an alcohol (OH) functional intermediate mesogen-containing segment (S9, S10, or S7), and DPTS (0.3 equivalents) were combined in DCM sufficient to provide approximately 90% dilution by weight. DCC (4.0 equivalents) was added in one portion and the reaction was stirred at room temperature. DCU was removed, and the filtrate was chromatographed using DCM-EtOAc (10:1 to 3:1) as eluent to give desired product. $^1$H NMR was used to confirm all product structures as well as the oligomer lengths in the purified products.

TABLE 3

| Example/CE No. | Tri-COOH Intermediate Central Segment (1.0 eq) | OH Functional Intermediate Mesogen-Containing Segment (3.0 eq) | Yield |
| --- | --- | --- | --- |
| Example 3 | C2 | S9 | 50% |
| Example 4 | C2 | S10 | 64% |
| Comparative Example CE-5 | C2 | S7 | 60% |

Example 6, CE-7 and CE-8

The mesogen-containing compounds of Example 6, CE-7, and CE-8 were prepared in accordance with the following general procedure.

As summarized in the following Table 4, one molar equivalent of a trifunctional hydroxyl (Tri-OH) intermediate central segment (as indicated), 3.5 molar equivalents of a carboxylic acid (COOH) functional intermediate mesogen-containing segment (S8, S5, or S2), 4-toluenesulfonic acid (0.5 equivalents), and DMAP (0.5 equivalents) were combined in DCM sufficient to provide approximately 90% dilution by weight. DCC (3.25-4.0 equivalents) was added in one portion. After stirring 24 hours under nitrogen, DCU precipitate was removed and the material was chromatographed (eluent was DCM/EtOAc). The material was dissolved in EtOAc and filtered through celite, then precipitated from MeOH to give the desired product. $^1$H NMR was used to confirm all product structures as well as the oligomer lengths in the purified products

TABLE 4

| Example/CE No. | Tri-OH Intermediate Central Segment (1.0 eq) | COOH Functional Intermediate Mesogen-Containing Segment (3.5 eq) | Yield |
| --- | --- | --- | --- |
| Example 6 | C1 | S8 | 63% |
| Comparative Example CE-7 | Caprolactone triol[1] | S5 | 41% |
| Comparative Example CE-8 | 2-ethyl-2-(hydroxymethyl)-1,3-propanediol | S2 | 66% |

[1] A polycaprolactone triol with an approximate Mn of 900, available from Sigma-Aldrich

Example 9

Step 1

Step 1 was accomplished following a procedure similar to Example 14 (described further herein) using the following amounts: Segment S1 (30.0 g), DPP (6.0 g), F-caprolactone (27.5 g), DCM (100 mL), 3-(allyloxy)propionic acid (8.0 g), DCC (15.0 g), DMAP (2.95 g). Yield: 50.0 g Step 2

To a nitrogen purged Schlenk tube were added the product of Step 2 above (15.0 g), 1,3-diphenyltetrakis(dimethylsiloxy)disiloxane (1.6 g), Karsted's Catalyst (5 drops, 2% Pt in xylenes) and toluene (25 mL). The Schlenk tube was then covered with aluminum foil, sealed with rubber cork, and stirred for 6 days at room temperature. The solvent removed and the solid dissolved in DCM before being chromatographed (eluent was 60% EtOAc in DCM). The waxy solid was dissolved in EtOAc (1 g/5 mL) and filtered through celite. The clear solution was precipitated by pouring into cold MeOH (1:5 vol/vol %, 0° C.). The precipitated product was filtered, washed with MeOH, and dried under vacuum at room temperature. Yield: 9 g, 51%.

Example 10 and CE-11

The mesogen-containing compounds of Example 10 and CE-11 were prepared in accordance with the following general procedure.

As summarized in the following Table 5, one molar equivalent of a tetrafunctional carboxylic acid (Tetra-COOH) intermediate central segment (as indicated), four molar equivalents of an alcohol (OH) functional intermediate mesogen-containing segment (S9 or S1), and DPTS (0.4-1.5 equivalents) were combined in DCM sufficient to provide approximately 90% dilution by weight. DCC (4.5 equivalents) was added in one portion and the reaction was stirred at room temperature. DCU was removed, and the filtrate was chromatographed using DCM-EtOAc (3:1) as eluent or recrystallized from THF/ethanol (2/1) to give desired product. $^1$H NMR was used to confirm all product structures as well as the oligomer lengths in the purified products.

TABLE 5

| Example/CE No. | Tetra-COOH Intermediate Central Segment (1.0 eq) | OH Functional Intermediate Mesogen-Containing Segment (4.0 eq) | Yield |
| --- | --- | --- | --- |
| Example 10 | C3 | S9 | 73% |
| Comparative Example CE-11 | 1,2,3,4-butanetetra-carboxylic acid | S1 | 84% |

Example 12 and CE-13

The mesogen-containing compounds of Example 12 and CE-13 were prepared in accordance with the following general procedure.

As summarized in the following Table 6, one molar equivalent of a chlorosilane (as indicated) and Et$_3$N (3.5-5 equivalents) were dissolved in DCM and cooled on ice. A solution of an alcohol (OH) functional intermediate mesogen-containing segment (S3, 3 eq's; or S6, 4 eq's) in DCM was slowly added over a few minutes. The crude reaction solution was washed with water (2×100 mL) and brine (2×50 mL). The organic phase was dried over MgSO$_4$ before being filtered through celite. The filtrate was passed through a silica gel plug topped with celite (eluent was 10-20% EtOAc in DCM). The resulting off-white, waxy solid was dissolved in DCM (1 mL/g). The solution was filtered through celite to remove the insoluble materials and the filtrate was slowly poured into cold hexanes (0° C., 100 mL) causing the material to precipitate out. $^1$H NMR was used to confirm all product structures as well as the oligomer lengths in the purified products

TABLE 6

| Example/CE No. | Chlorosilane (1.0 eq) | OH Functional Intermediate Mesogen-Containing Segment | Yield |
| --- | --- | --- | --- |
| Example 12 | 1,2-bis(dichloro(methyl)silyl)ethane | S3 (4 eq) | 49% |
| Comparative Example CE-13 | trichloro(propyl)silane | S6 (3 eq) | 59% |

Example 14 and CE-15

The mesogen-containing compounds of Example 14 and CE-15 were prepared in accordance with the following general procedure.

As summarized in the following Table 7, an alcohol (OH) functional intermediate mesogen-containing segment (4.0-4.5 molar equivalents) and F-caprolactone (molar equivalents as indicated) were combined. To this was added DPP (2.0-2.25 equivalents) and the mixture was stirred under nitrogen for 4 hours to form a new alcohol. One molar equivalent of a tetra-carboxylic acid (Tetra-COOH) intermediate central segment (as indicated), DMAP (2.0-2.26 equivalent) and DCC (6 equivalents) were next added. After stirring overnight, DCU was removed and the filtrate washed twice with NaHCO$_3$, twice 5% NaOH, twice 10% HCl, twice with brine. After stirring with MgSO$_4$, the material was passed through a pad of silica gel (eluent was 5-25% EtOAc in DCM). The crude product was re-dissolved in EtOAc (1 g/4 mL), filtered through celite, and precipitated from a mixture of EtOAc and MeOH (1:8 v/v). $^1$H NMR was used to confirm all product structures as well as the oligomer lengths in the purified products.

TABLE 7

| Example/ CE No. | OH Functional Intermediate Mesogen- Containing Segment (4.0 eq) | ε- caprolactone equivalents | Tetra-COOH Intermediate Central Segment (1.0 eq) | Yield |
| --- | --- | --- | --- | --- |
| Example 14 | S1 | 18.2 | 1,2,3,4-butanetetra-carboxylic acid | 100% |
| Comparative Example CE-15 | S4 | 12.0 | C4 | 64% |

TABLE 8

| Example | Representative Structure |
|---|---|
| 1 | |
| 2 | |
| 3 | |

TABLE 8-continued

| Example | Representative Structure |
|---|---|
| 4 | (structure) |
| CE-5 | (structure) |

TABLE 8-continued
| Example | Representative Structure |
|---|---|
| 6 | 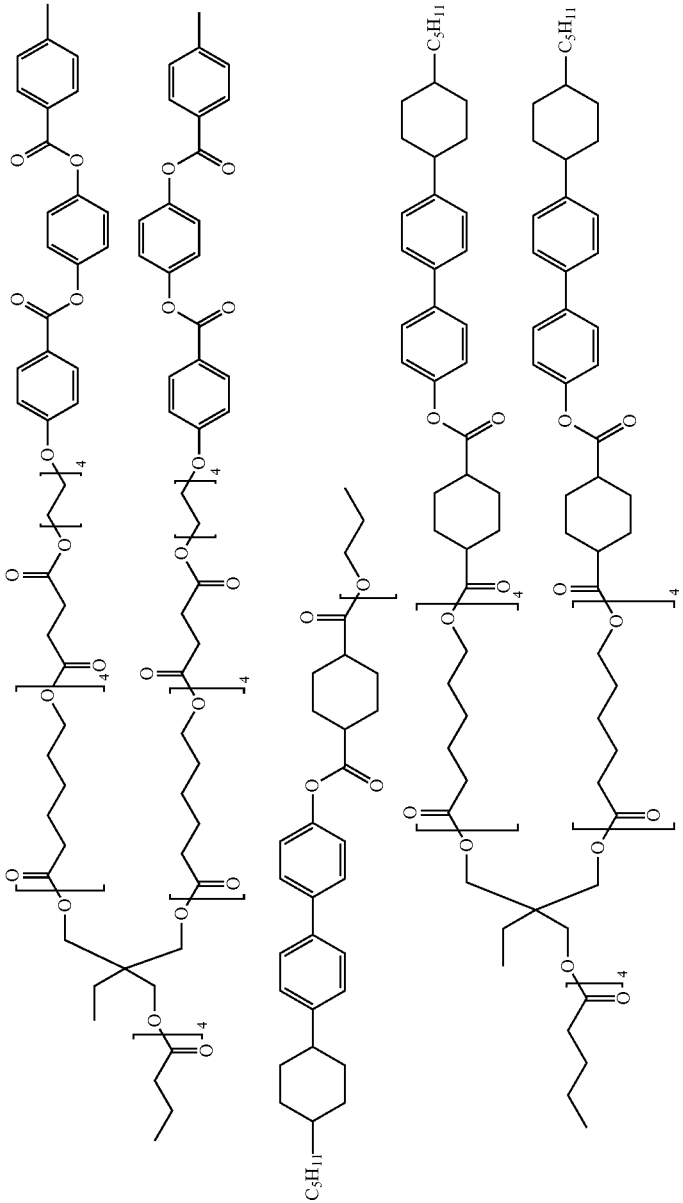 |
| CE-7 | 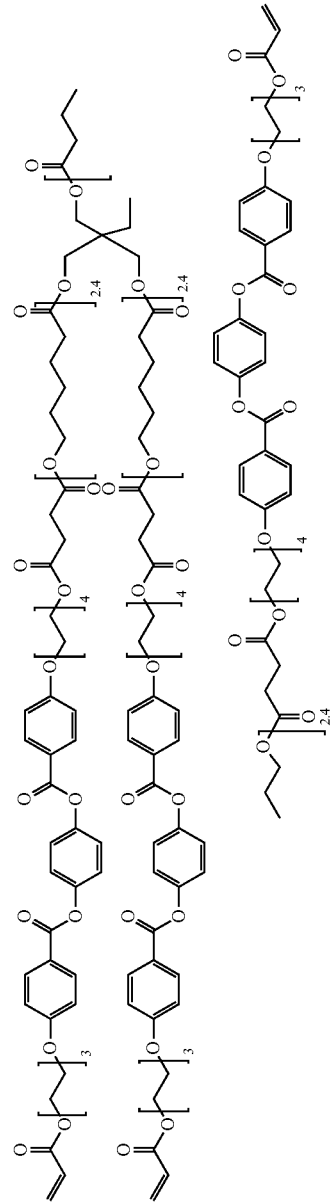 |

TABLE 8-continued
| Example | Representative Structure |
|---|---|
| CE-8 | 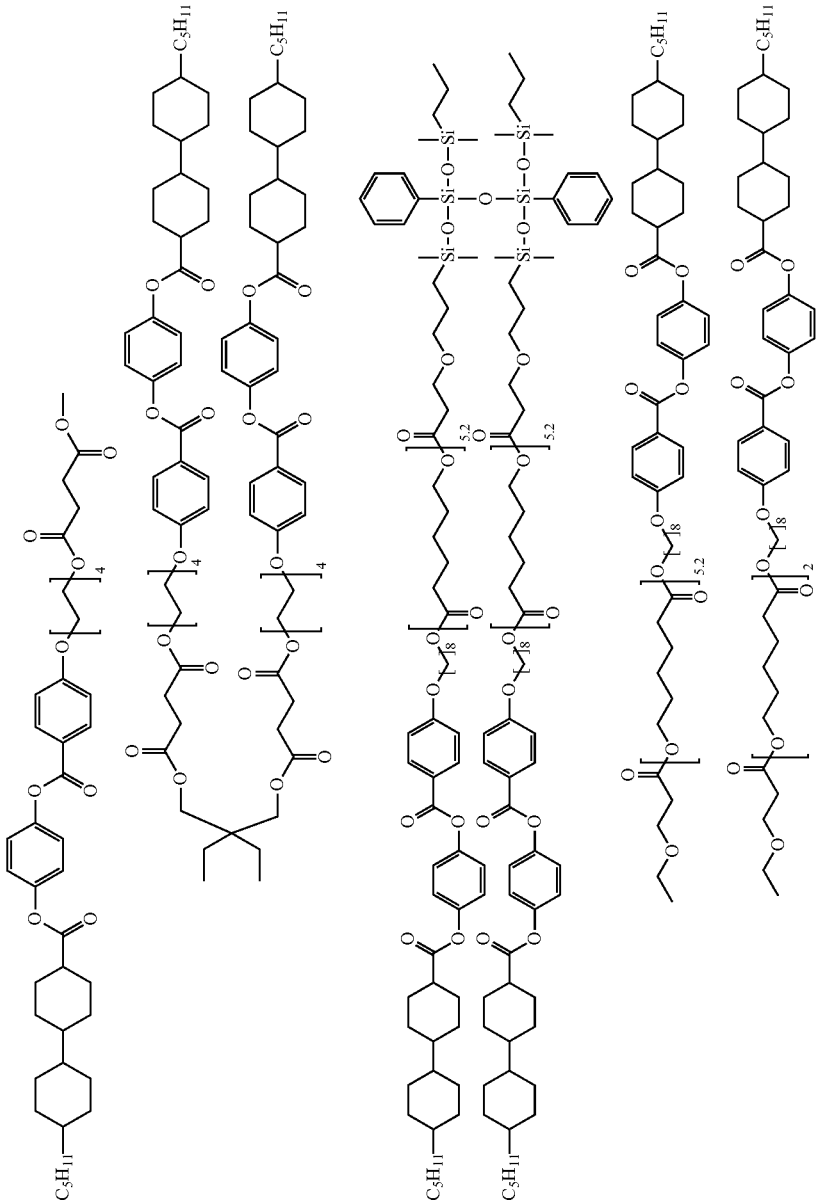 |
| 9 | |

TABLE 8-continued
| Example | Representative Structure |
|---|---|
| 10 | 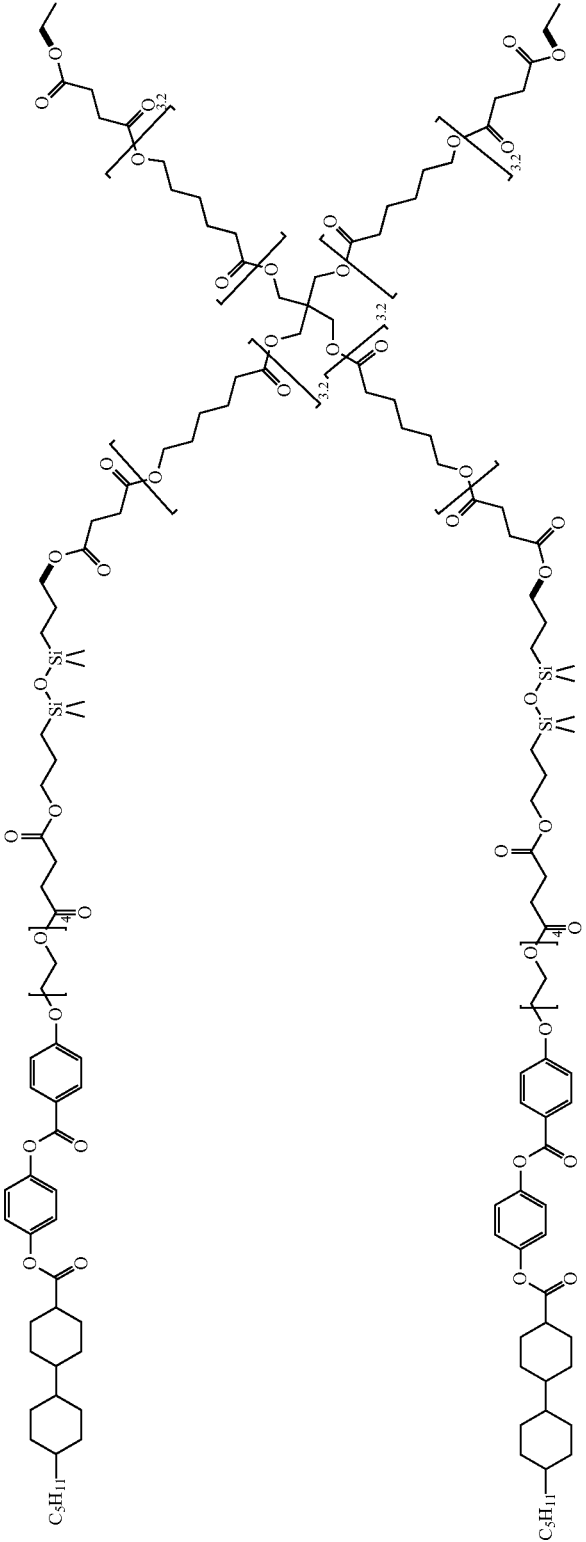 |
| CE-11 | 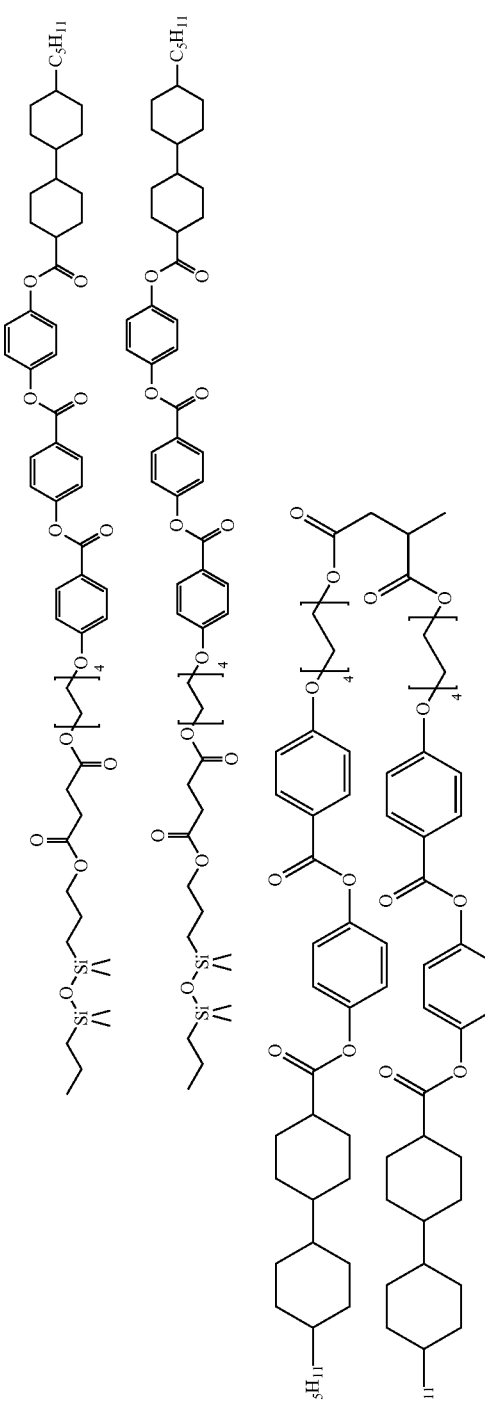 |

TABLE 8-continued
| Example | Representative Structure |
|---|---|
| 12 | 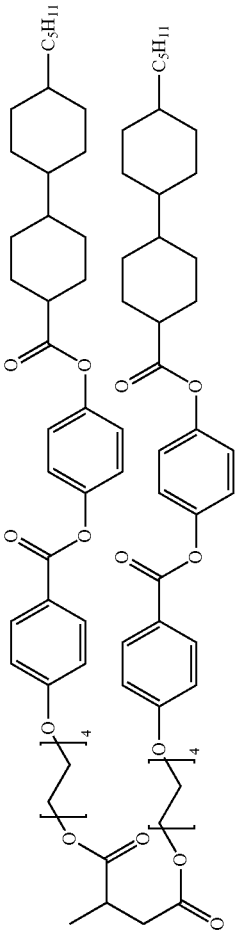 |
| CE-13 | 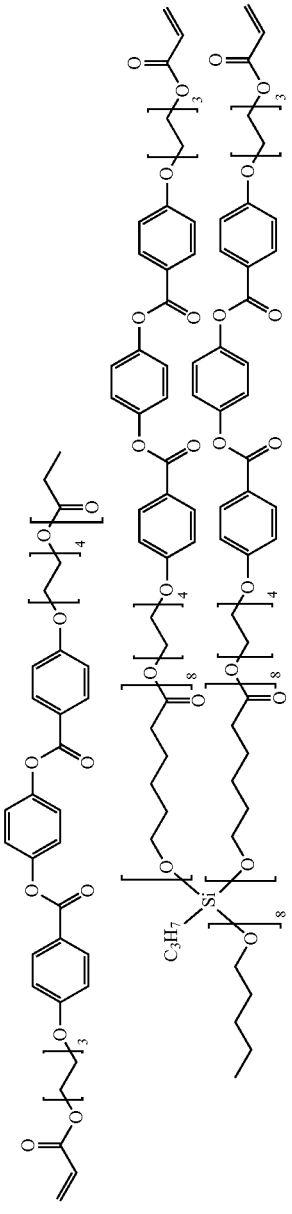 |

TABLE 8-continued
| Example | Representative Structure |
|---|---|
| 14 | 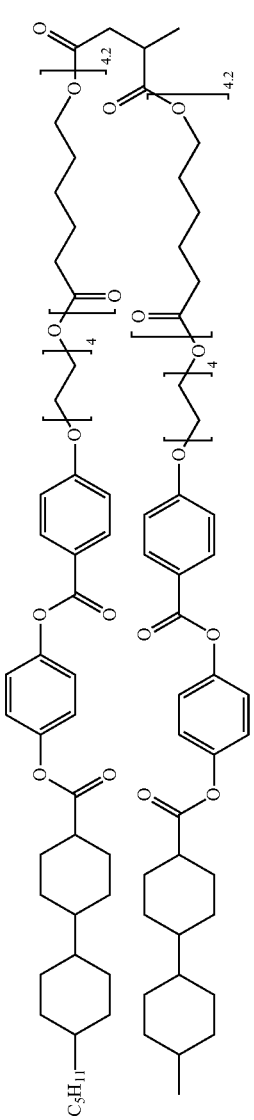 |
| CE-15 | 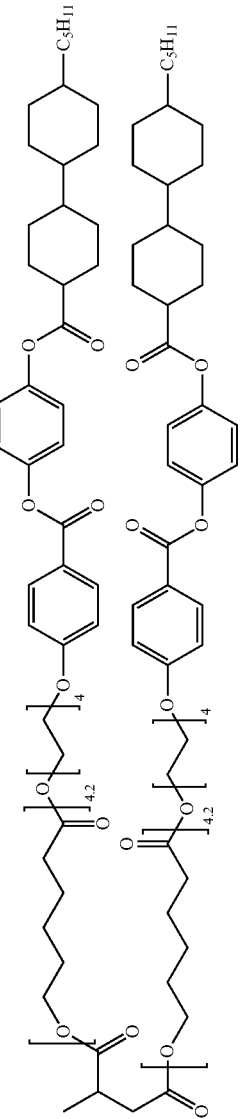 |

Part 4

The preparation of liquid crystal coating formulations is described as follows. In Part 4a the preparation of a Standard Liquid Crystal Coating Formulation is described. In Part 4b the preparation of liquid crystal coating formulations that include mesogen-containing compounds is described.

Part 4a.

Preparation of Standard Liquid Crystal Coating Formulation.

In suitable containers equipped with a stir bar, the ingredients in Charge 1, listed in Table 9, were charged and stirred at room temperature until a homogeneous solution was obtained. Then Charge 2 was added and the resulting mixture was stirred for 1 hour at 90° C. The liquid crystal monomers (Charge 3) were then added and the solution stirred for an additional hour at 90° C. The temperature of the solution was then reduced to 60° C. and Charge 4 was added to the solution and the mixture was stirred for 30 minutes to obtain the final solution.

TABLE 9

Standard Liquid Crystal Coating Formulation

| Charge | Component | Amount (parts by weight) |
| --- | --- | --- |
| 1 | Anisole | 1.995 |
|  | BYK ®-322[1] | 0.002 |
|  | 4-Methoxyphenol | 0.003 |
| 2 | Photochromic dichroic dyes[2] | 0.36 |
| 3 | RM257[3] | 1.26 |
|  | LCM-2[4] | 0.66 |
|  | LCM-3[5] | 0.54 |
|  | LCM-4[6] | 0.54 |
| 4 | IRGACURE ® 819[7] | 0.045 |

[1]An aralkyl modified poly-methyl-alkyl-siloxane available from BYK Chemie, USA.
[2]A mixture of five photochromic-dichroic indenofused naphthopyran dyes formulated to give a grey color on activation.
[3]A liquid crystal monomer 4-(3-acryloyloxypropyloxy)-benzoic acid 2-methyl-1,4-phenylene ester, available commercially from EMD Chemicals, Inc.
[4]4-((4-((8-((6-((6-((6-((6-((6-((6-(methacryloyloxy)hexanoyl)oxy)hexanoyl)oxy)hexanoyl)oxy) hexanoyl)oxy) hexanoyl)oxy) hexanoyl)oxy) hexanoyl)oxy) hexanoyl)oxy) octyl)oxy)benzoyl)oxy)phenyl 4'-pentyl-[1,1'-bi(cyclohexane)]-4-carboxylate, prepared according to procedures described in U.S. Pat. No. 7,910,019B2.
[5]1-(6-(6-(6-(6-(6-(6-(6-(8-(4-(4-(4-(6-acryloyloxyhexyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexanol, prepared in accordance with Example 17 in U.S. Pat. No. 7,910,019 B2.
[6]3-methyl-4-((4-pentylcyclohexane-1-carbonyl)oxy)phenyl 4-((6-(acryloyloxy)hexyl)oxy)benzoate.
[7]A photoinitiator available from BASF.

Part 4b.

Preparation of Liquid Crystal Coating Formulations Including Mesogen-Containing Compounds.

Liquid crystal coating formulations including mesogen-containing compounds were prepared by adding certain mesogen-containing compounds (as indicated in Table 10) to the Standard Liquid Crystal Coating Formulation described in Part 4a. The mixtures were prepared as summarized in the following Table 10, where each mesogen-containing compound was added to 5.4 parts Standard Liquid Crystal Coating Formulation. The components were combined and stirred at 80° C. for 1 hour to achieve a homogeneous solution. The additive quantities are calculated based on 2.2 mol % of liquid crystal monomers. Anhydrous magnesium sulfate was then added into the solution followed by stirring at room temperature for 30 minutes. Magnesium sulfate was then filtered away by centrifuging and the filtrate was used for spin coating.

TABLE 10

| Example | Mesogen-Containing Compound | Parts by weight of Mesogen-Containing Compound |
| --- | --- | --- |
| CE-16 | None | None |
| Example 17 | Example 1 | 0.27 |
| Example 18 | Example 2 | 0.25 |
| CE-19 | CE-7 | 0.26 |
| CE-20 | CE-13 | 0.39 |
| Example 21 | Example 3 | 0.43 |
| Example 22 | Example 4 | 0.43 |
| Example 23 | Example 6 | 0.24 |
| CE-24 | CE-5 | 0.27 |
| CE-25 | CE-8 | 0.19 |
| Example 26 | Example 9 | 0.48 |
| Example 27 | Example 10 | 0.49 |
| Example 28 | Example 12 | 0.35 |
| Example 29 | Example 14 | 0.39 |
| CE-30 | CE-11 | 0.23 |
| CE-31 | CE-15 | 0.37 |

Part 5

The preparation of coated substrates (test specimens), using the liquid crystal coating formulations of Part 4b (Table 10), are described as follows.

The following procedure was used to form coated substrates (test specimens). Each liquid crystal coating formulation described in Part 4b (Table 10) was spin coated at a rate of 400 revolutions per minute (rpm) for 6 seconds, followed by 1250 rpm for 6 seconds onto CR-39© lens substrates having an alignment layer. Each coated substrate was placed in an oven at 60-75° C. for 30 minutes to facilitate alignment, after which they were cured under two ultraviolet lamps in a UV curing oven designed and built by Belcan Engineering under nitrogen while running on a conveyor belt at 2 ft/min (61 cm/min) speed at peak intensity of 0.388 Watts/cm$^2$ of UVA and 0.165 Watts/cm$^2$ of UVV; and UV dosage of 7.386 Joules/cm$^2$ of UVA and 3.337 Joules/cm$^2$ of UVV.

Part 6

There is described as follows, photochromic performance testing of the coated substrates (test specimens) of Part 5 and test results thereof (including absorption ratio and optical response measurements and results).

Prior to response testing on an optical bench, the test specimens were conditioned in a multistep custom built conditioning unit. First they were exposed to 365 nm ultraviolet light for 10 minutes at a distance of about 10 cm from the source of electromagnetic radiation, in order to pre-activate the photochromic compounds. The UVA irradiance at the sample was measured to be 7.7 Watts per square meter. Next, the test specimens were heated to and held at 70° F. (21.1° C.) for 10 minutes. Finally, the heating element was turned off and F17T8 Yellow Halogen lights were turned on for 30 minutes in order to bleach, or inactivate, the photochromic compounds in the test specimens. The illuminance from the yellow halogen lights at the test specimen was measured to be 9.0 Klux. The test specimens were then kept in a dark environment for at least 1 hour prior to testing in order to cool and continue to fade back to a ground state.

An optical bench was used to measure the optical properties of the test specimens and derive the absorption ratio and photochromic properties. Each test specimen was placed on the optical bench with an activating light source positioned at a 300 to 350 angle of incidence to the surface of the test sample. The activating light source used was a Xenon Arc Lamp powered by a Newport/Oriel Model 69911 300-Watt power supply fitted with a UNIBLITZ® VS-25 high-speed computer controlled shutter that momentarily closed during data collection so that stray light would not interfere with the data collection process, a SCHOTT® 3 mm KG-2 heat absorbing filter, which removed short wavelength radiation, neutral density filter(s) for intensity attenuation and a condensing lens for beam collimation. The arc lamp was equipped with a Digital Exposure Controller and sensor (Newport/Oriel model 68945) in order to maintain fine control of the output over time.

A broadband light source for monitoring response measurements was positioned in a perpendicular manner to the surface of the test specimen. Increased signal of shorter visible wavelengths was obtained by collecting and combining separately filtered light from a 100-Watt tungsten halogen lamp (controlled by a LAMBDA® ZUP60-14 constant voltage power supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4 to 6 inch (10.2 to 15.25 cm) light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven (analyzer polarizer), motorized rotation stage (Model M-061.PD, M660, U651 or equivalent from Physik Instrumente). The monitoring beam was set so that the one polarization plane (0°) was perpendicular to the plane of the optical bench table and the second polarization plane (90°) was parallel to the plane of the optical bench table. The test specimens were run in air, at 23° C.±0.1° C. (which temperature was maintained by a temperature controlled air cell).

To align the test specimens prepared in Part 4, a second polarizer was added to the optical path (research grade film polarizer, such as a polarizer from OptoSigma, SPF-50C-32). The second polarizer was set to 900 (+/−0.1 degrees) of the first analyzer polarizer. The sample was placed in an air cell in a self-centering holder mounted on a rotation stage (Model M-061.PD, M660, U651 or equivalent from Physik Instrumente). A laser beam (Coherent-ULN 635 diode laser) was directed through the crossed polarizers and sample. The signal intensity of the laser beam was measured, in relative counts by the spectrophotometer. The test specimen was rotated 120 degrees in 3 degree increments in order to locate a minimum transmitted light intensity of the laser beam. The test specimen was then positioned near the minimum transmitted light intensity and then the test specimen was rotated 12 degrees in 0.1 degree steps in order to locate the minimum transmission to +/−0.1 degrees, depending upon the sample quality. The test specimen was then finally positioned at the minimum transmission angle. At this point the test specimen was aligned either parallel or perpendicular to the Moxtek analyzer polarizer. The second polarizer and the diode laser beam were removed from the optical path. Using this process, test specimens were aligned to ±0.1 degrees prior to any activation.

To conduct the measurements, each test specimen was exposed to roughly 6.7 W/m$^2$ of UVA from the activating light source for 15 minutes to activate the photochromic compounds. An International Light Research Radiometer (Model ILT950(FC) with a detector system was used to verify exposure at the beginning of each day. Light from the monitoring source that was polarized to the 0° polarization plane was then passed through the sample and focused into a 1 inch (2.54 cm) integrating sphere, which was connected to an OCEAN OPTICS® S2000 spectrophotometer using a single function fiber optic cable. The spectral information, after passing through the sample, was collected using OCEAN OPTICS Drivers in conjunction with propriety software from Transitions Optical, Ltd. While the photochromic material was activated, the position of the polarizer was rotated back and forth to polarize the light from the monitoring light source to the 900 polarization plane and back. Data was collected for approximately 600 to 1200 seconds at 5 second intervals during activation. For each test, rotation of the polarizers was adjusted to collect data in the following sequence of polarization planes: 0°, 90°, 90°, 0°, etc.

Absorption ratio (AR) is the ratio of absorbance measured at 900 polarization (perpendicular orientation with the analyzer polarizer, minimum transmission) and 0° polarization (parallel orientation with the analyzer polarizer, maximum transmission).

Change in optical density ($\Delta$OD) from the bleached state (unactivated state) to the darkened state (activated state) was determined by establishing the initial transmittance, opening the shutter from the xenon lamp to provide ultraviolet radiation to change the test specimen from the bleached state to an activated state. Data was collected at selected intervals of time, measuring the transmittance in the activated state, and calculating the change in optical density according to the formula: $\Delta OD=\log(\% Tb/\% Ta)$, where % Tb is the percent transmittance in the bleached state, % Ta is the percent transmittance in the activated state and the logarithm is to the base 10.

The fade half-life (T½) is the time interval in seconds for the $\Delta$OD of the activated form of the photochromic compounds in the test specimens to reach one half the $\Delta$OD measured after fifteen minutes, or after saturation or near-saturation was achieved, at room temperature after removal of the source of activating light, e.g., by closing the shutter.

The photochromic performance test results (absorption ratio and fade half-life) obtained from representative examples according to the present invention (Examples) and Comparative Examples (CE's) are summarized in the following Table 11.

TABLE 11

| Photochromic Performance Test Results | | |
|---|---|---|
| Example | AR | Fade (T$_{1/2}$) |
| 1. Mesogen-Containing Compounds having Three | | |
| 17 | 6.4 | 192 |
| 18 | 6.3 | 193 |
| CE-19 | 4.7 | 216 |
| CE-20 | 4.5 | 176 |
| 2. Mesogen-Containing Compounds having Three Extensions and No Reactive Groups | | |
| 21 | 6.2 | 196 |
| 22 | 6.1 | 197 |
| 23 | 6.3 | 192 |
| CE-24 | 4.7 | 211 |
| CE-25 | | Insoluble$^2$ |
| 3. Mesogen-Containing Compounds having Four Extensions and No Reactive Groups | | |
| 26 | 6.4 | 174 |
| 27 | 6.2 | 197 |
| 28 | 6.7 | 175 |

TABLE 11-continued

Photochromic Performance Test Results

| Example | AR | Fade ($T_{1/2}$) |
|---|---|---|
| 29 | 6.1 | 196 |
| CE-30 | | Insoluble[2] |
| CE-31 | 4.9 | 207 |

4. Control—Composed Only of the Standard Liquid Crystal Coating Formulation

| CE-16 | 4.8 | 234 |
|---|---|---|

[2] The comparative examples CE-8 and CE-11 were not soluble in the Standard Liquid Crystal Coating Formulation, and a homogenous solution corresponding to CE-25 and CE-30 could not be attained with any of the following solvents: anisole, NMP and mixture of anisole/NMP at different ratios. The resulting mixtures failed to align after spin coating and therefore photochromic performance data thereof are not available.

The photochromic performance results as summarized in Table 11 demonstrate that mesogen-containing compounds according to the present invention (in which at least one Mesogen group thereof includes at least four cyclic groups) provide improved Absorption Ratio values as compared to comparative mesogen-containing compounds, in which the Mesogen groups thereof only include three cyclic groups. In addition, it was observed that mesogen-containing compounds according to the present invention (in which each -L- linking group independently has an average chain length of at least 15 bonds, and where at least one -L- linking group has an average chain length of at least 25 bonds) had desirable solubility, as compared to CE-25 (which included comparative mesogen-containing compound CE-8 having three separate -L-[Mesogen] extensions) and CE-30 (which included comparative mesogen-containing compound CE-11 having four separate -L-[Mesogen] extensions).

With further reference to the performance results as summarized in Table 11, in all cases, the comparative mesogen-containing compounds/formulations provided no improvement in Absorption Ratio as compared to the Standard Liquid Crystal Coating Formulation alone (CE-16).

The present invention has been described with reference to specific details of particular embodiments thereof. It is not intended that such details be regarded as limitations upon the scope of the invention except insofar as to the extent that they are included in the accompanying claims.

What is claimed is:

1. A mesogen-containing compound represented by the following Formula (I),

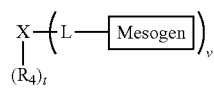

wherein,
v is 3 or 4,
t is 0 or 1,
(A) each Mesogen, independently for each v, is represented by the following Formula (II),

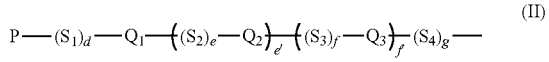

wherein for Formula (II),
P is selected from hydrogen, halogen, alkyl, haloalkyl, alkoxy, haloalkoxy, acrylate, methacrylate, trihalomethacrylate, cyanoacrylate, acrylamido, methacrylamido, oxirane, hydroxyl, primary amino, carboxylic acid, carboxylic acid ester, siloxane, carbosilane, cyano, or nitro;

$S_1$, $S_2$, $S_3$, and $S_4$, for each occurrence, are independently selected from a spacer unit chosen from —$CH_2$—; —O—; —C(O)—; —N=N—; —CH=CH—; —C≡C—; —CH=N—; —$CF_2$—; or —NH—, provided that when two spacer units comprising heteroatoms are linked together the spacer units are linked so that heteroatoms are not directly linked to each other;

d is 0 to 20;
e, f, and g, for each occurrence, are independently 0 to 3;

$Q_1$, $Q_2$, and $Q_3$, for each occurrence, are independently a divalent group selected from the group consisting of unsubstituted or substituted cycloalkyl; unsubstituted or substituted phenyl; unsubstituted or substituted naphthyl; and unsubstituted or substituted triptycenyl; wherein each cycloalkyl substituent, each phenyl substituent, each naphthyl substituent, and each triptycenyl substituent is in each case independently selected from —($S_1$)$_d$—P, where $S_1$, d, and P are each as defined with regard to Formula (II); and e' and f', for each occurrence, are independently from 0 to 6, provided the sum of e' and f' is at least 2;

(B) each -L-, independently for each v, is represented by the following Formula (III),

wherein,
(i) y is 0 to 30;
(ii) each A independently for each y is a divalent group selected from the group consisting of single bond, aliphatic group, and haloaliphatic group;
(iii) each B independently for each y is a divalent group selected from the group consisting of —O—; —C(O)O—; —OC(O)O—; —C(O)N($R_1$)— where $R_1$ is H or alkyl; —NH—C(O)O—; —N($R_2$)C(O)N($R_2$)— where each $R_2$ is independently selected from H or alkyl;

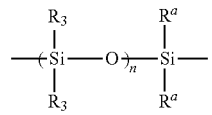

where n is 1 to 4, each $R^a$ is independently methyl, ethyl, or phenyl, and each $R_3$ independently for each n is independently selected from methyl, ethyl, or phenyl;

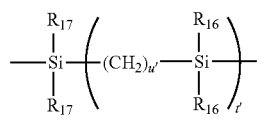

where t' is from 1 to 4, u' is from 1 to 5 independently for each t', each $R_{16}$ independently for each t' is independently selected from methyl, ethyl, or phenyl, and each $R_{17}$ is independently selected from methyl, ethyl, or phenyl; and —$S_1(R_5)(R_5)$— where each $R_5$ is independently selected from methyl, ethyl, or phenyl; and (iv) E is a divalent group selected from the group consisting of aliphatic group and haloaliphatic group;

(C) X is a polyvalent group selected from the group consisting of Si; siloxane having from 2 to 6 Si atoms; carbosilane having from 2 to 5 Si atoms, and from 1 to 5 methylene groups between each pair of Si atoms; and unsubstituted or substituted aliphatic group having from 1 to 10 carbon atoms; wherein each aliphatic group substituent is in each case independently selected from —$(S_1)_d$—P, where $S_1$, d, and P are each as defined with regard to Formula (II); and (D) $R_4$ is selected from the group consisting of —$(S_1)_d$—P, where $S_1$, d, and P are each as defined with regard to Formula (II); =O; and unsubstituted or substituted phenyl group, wherein each phenyl substituent is independently selected from —$(S_1)_d$—P, where $S_1$, d, and P are each as defined with regard to Formula (II), provided that at least one Mesogen includes at least four cyclic groups, and provided that each -L- independently comprises an average chain length of at least 15 bonds, and further provided that at least one -L- comprises an average chain length of at least 25 bonds.

2. The mesogen-containing compound of claim 1, wherein independently for each Mesogen, and independently for each Formula (II), $Q_1$, $Q_2$, and $Q_3$ for each occurrence, are independently a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; and unsubstituted or substituted 1,8-naphthyl, wherein each 1,4-cycloalkyl substituent, each 1,4-phenyl substituent, each 1,5-naphthyl substituent, each 2,6-naphthyl substituent, and each 1,8-naphthyl substituent is in each case independently selected from —$(S_1)_d$—P, where $S_1$, d, and P are each as defined with regard to Formula (II), and X is a polyvalent group selected from the group consisting of Si; unsubstituted or substituted $C_1$-$C_{10}$ alkyl, wherein each $C_1$-$C_{10}$ alkyl substituent is independently selected from —$(S_1)_d$—P, where $S_1$, d, and P are each as defined with regard to Formula (II); siloxane represented by the following Formula (1); and carbosilane represented by the following Formula (2),

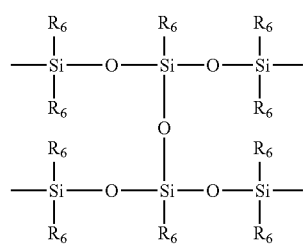

(1)

wherein for Formula (1), each $R_6$ is independently selected from methyl, ethyl, or phenyl,

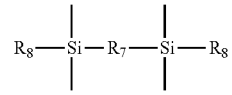

(2)

wherein for Formula (2), $R_7$ is a divalent aliphatic group having from 1 to 5 carbon atoms, and each $R_8$ is independently selected from methyl, ethyl, or phenyl.

3. The mesogen-containing compound of claim 2, wherein independently for each Mesogen, and independently for each Formula (II), P is selected from hydrogen, alkyl, alkoxy, acrylate, or methacrylate;

for Formula (III), (i) y is 1 to 30;

(ii) each A independently for each y is a divalent group selected from the group consisting of alkyl and haloalkyl;

(iii) each B independently for each y is a divalent group selected from the group consisting of —O—; —C(O)O—; —OC(O)O—; —C(O)N($R_1$)— where $R_1$ is H or alkyl; —NH—C(O)O—; —N($R_2$)C(O)N($R_2$)— where each $R_2$ is independently selected from H or alkyl;

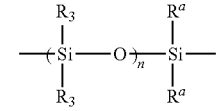

where n is 1 to 4, each $R^a$ is independently methyl, ethyl, or phenyl, and each $R_3$ independently for each n is independently selected from methyl, ethyl, or phenyl; and —Si($R_5$)($R_5$)— where each $R_5$ is independently selected from methyl, ethyl, or phenyl; and (iv) E is a divalent group selected from the group consisting of alkyl groups and haloalkyl groups.

4. The mesogen-containing compound of claim 1, wherein for at least one Mesogen, P of Formula (II) is in each case independently selected from acrylate, methacrylate, trihalomethacrylate, cyanoacrylate, oxirane, hydroxyl, primary amino, carboxylic acid, carboxylic acid ester, siloxane, carbosilane, cyano, or nitro.

5. The mesogen-containing compound of claim 1, wherein at least one Mesogen, for at least one v, is in each case independently represented by the following Formula (IV),

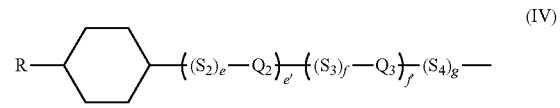

(IV)

wherein R is selected from hydrogen, halogen, alkyl, haloalkyl, alkoxy, or haloalkoxy, and $S_2$, $S_3$, $S_4$, $Q_2$, $Q_3$, e', f', e, f, and g are each independently as defined with regard to Formula (II).

6. The mesogen-containing compound of claim 1, wherein for each v, each Mesogen is the same.

7. The mesogen-containing compound of claim 1, wherein each -L-, independently for each v, comprises an average chain length of at least 25 bonds.

8. A liquid crystal composition comprising the mesogen-containing compound of claim 1.

9. The liquid crystal composition of claim 8, further comprising at least one of a photochromic compound, a dichroic compound, or a photochromic-dichroic compound.

10. The liquid crystal composition of claim 9, wherein said photochromic-dichroic compound comprises at least one photochromic moiety, and said photochromic compound and each photochromic moiety of said photochromic-dichroic compound are in each case independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, or mixtures thereof.

11. An optical element comprising:
a substrate; and
a layer on at least a portion of a surface of said substrate, wherein said layer comprises the mesogen-containing compound of claim 1.

12. The optical element of claim 11, further comprising an alignment layer interposed between said substrate and said layer, wherein said alignment layer is at least partially alignable by exposure to at least one of a magnetic field, an electric field, linearly polarized radiation, shear force, or combinations of two or more thereof.

13. The optical element of claim 12, wherein said optical element is selected from a display element, a window, a mirror, a liquid crystal cell element, or an ophthalmic element.

14. The optical element of claim 13, wherein the optical element is an ophthalmic element, wherein said ophthalmic element is selected from a corrective lens, a non-corrective lens, a contact lens, an intra-ocular lens, a magnifying lens, a protective lens, or a visor.

\* \* \* \* \*